(12) United States Patent
Windler et al.

(10) Patent No.: US 9,504,348 B2
(45) Date of Patent: Nov. 29, 2016

(54) CARTRIDGE EJECTION SYSTEMS AND METHODS FOR SINGLE-SERVE BEVERAGE PRODUCTION MACHINES

(71) Applicant: Starbucks Corporation, Seattle, WA (US)

(72) Inventors: Andrew Timm Windler, San Francisco, CA (US); Philipe Roget Manoux, Oakland, CA (US)

(73) Assignee: Starbucks Corporation, Seattle, WA (US)

( * ) Notice: Subject to any disclaimer, the term of this patent is extended or adjusted under 35 U.S.C. 154(b) by 315 days.

(21) Appl. No.: 14/205,261

(22) Filed: Mar. 11, 2014

(65) Prior Publication Data
US 2015/0257585 A1    Sep. 17, 2015

(51) Int. Cl.
*A47J 31/00*    (2006.01)
*A47J 31/44*    (2006.01)
*A47J 31/36*    (2006.01)

(52) U.S. Cl.
CPC ........... *A47J 31/446* (2013.01); *A47J 31/3633* (2013.01); *A47J 31/3638* (2013.01)

(58) Field of Classification Search
CPC ............. A47J 31/3638; A47J 31/3633; A47J 31/3614
USPC ................... 99/289 R, 284, 289 D, 291, 295
See application file for complete search history.

(56) References Cited

U.S. PATENT DOCUMENTS

| | | | |
|---|---|---|---|
| 3,483,811 A * | 12/1969 | Heier | A47J 31/3614 99/289 R |
| 3,948,157 A * | 4/1976 | Layre | A47J 31/0663 99/289 R |
| 4,860,645 A | 8/1989 | van der Lijn et al. | |
| 5,495,793 A | 3/1996 | Muis et al. | |
| 5,520,093 A | 5/1996 | Ackermann | |
| 5,551,988 A | 9/1996 | Reyhanloo et al. | |
| 6,009,792 A | 1/2000 | Kraan | |
| 6,021,705 A | 2/2000 | Dijs | |
| 6,026,732 A | 2/2000 | Kollep et al. | |
| 6,079,315 A | 6/2000 | Beaulieu et al. | |
| 6,182,554 B1 | 2/2001 | Beaulieu et al. | |
| 6,510,783 B1 | 1/2003 | Basile et al. | |

(Continued)

FOREIGN PATENT DOCUMENTS

| | | |
|---|---|---|
| CA | 2557883 C | 11/2009 |
| CA | 2429631 C | 1/2011 |

(Continued)

OTHER PUBLICATIONS

International Search Report and Written Opinion in corresponding International Patent Application No. PCT/US2015/019397, mailed Sep. 4, 2015, in 17 pages.

*Primary Examiner* — Reginald L Alexander
(74) *Attorney, Agent, or Firm* — Knobbe Martens Olson & Bear LLP

(57) ABSTRACT

Systems and methods for ejecting cartridges from single-serve beverage preparation machines are disclosed. In some embodiments, an ejection system is configured to facilitate ejection of the cartridge from a chamber in a rotatable basket unit. The ejection system can encourage the cartridge out of the chamber during the rotation of the basket unit, such as by force or gravity, by spring-loaded pins, or otherwise.

12 Claims, 30 Drawing Sheets

(56) References Cited

U.S. PATENT DOCUMENTS

| | | |
|---|---|---|
| 6,655,260 B2 | 12/2003 | Lazaris et al. |
| 6,685,365 B2 | 2/2004 | White |
| 6,725,762 B2 | 4/2004 | Kollep et al. |
| 6,763,759 B2 | 7/2004 | Denisart |
| 6,786,134 B2 | 9/2004 | Green |
| 6,832,542 B2 | 12/2004 | Hu et al. |
| 6,948,420 B2 | 9/2005 | Kirschner et al. |
| 6,955,116 B2 | 10/2005 | Hale |
| 6,978,682 B2 | 12/2005 | Foster et al. |
| 6,990,891 B2 | 1/2006 | Tebo |
| 7,028,604 B2 | 4/2006 | Cortese |
| 7,093,530 B2 | 8/2006 | Meister et al. |
| 7,165,488 B2 | 1/2007 | Bragg et al. |
| 7,216,582 B2 | 5/2007 | Yoakim et al. |
| 7,219,596 B2 * | 5/2007 | Kief, Jr. ............. A47J 31/4467 99/289 R |
| 7,243,867 B2 | 7/2007 | Steckhan |
| 7,255,039 B2 | 8/2007 | Halliday et al. |
| 7,320,274 B2 | 1/2008 | Castellani |
| 7,325,479 B2 | 2/2008 | Laigneau et al. |
| 7,347,138 B2 | 3/2008 | Bragg et al. |
| 7,464,636 B2 | 12/2008 | Mariller |
| 7,543,527 B2 | 6/2009 | Schmed |
| 7,569,243 B2 | 8/2009 | Yoakim et al. |
| 7,592,027 B2 | 9/2009 | Halliday et al. |
| 7,650,831 B2 | 1/2010 | Denisart et al. |
| 7,669,518 B2 | 3/2010 | Bardazzi |
| 7,698,992 B2 | 4/2010 | Wei |
| 7,726,233 B2 | 6/2010 | Kodden et al. |
| 7,798,054 B2 | 9/2010 | Evers et al. |
| 7,815,953 B2 | 10/2010 | Mastropasqua et al. |
| 7,823,501 B2 | 11/2010 | Rijskamp et al. |
| 7,827,905 B2 | 11/2010 | Bardazzi |
| 7,832,328 B2 | 11/2010 | Koeling et al. |
| 7,856,920 B2 | 12/2010 | Schmed et al. |
| 7,883,733 B2 | 2/2011 | Cortese |
| 7,946,217 B2 | 5/2011 | Favre et al. |
| 7,992,486 B2 | 8/2011 | Constantine et al. |
| 7,993,691 B2 | 8/2011 | Yoakim et al. |
| 8,002,146 B2 | 8/2011 | Cahen et al. |
| 8,028,616 B2 | 10/2011 | Van Der Meer et al. |
| 8,039,036 B2 | 10/2011 | Knitel et al. |
| 8,071,147 B2 | 12/2011 | Steenhof et al. |
| 8,074,560 B2 | 12/2011 | Levi et al. |
| 8,079,300 B2 | 12/2011 | Jing |
| 8,091,469 B2 | 1/2012 | Cahen et al. |
| 8,095,242 B2 | 1/2012 | Quah |
| 8,109,200 B2 | 2/2012 | Hansen |
| 8,191,463 B2 | 6/2012 | Spinelli |
| 8,202,560 B2 | 6/2012 | Yoakim et al. |
| 8,210,095 B2 | 7/2012 | Brezovnik et al. |
| 8,210,098 B2 | 7/2012 | Boussemart et al. |
| 8,225,710 B2 | 7/2012 | De Graaff et al. |
| 8,272,319 B2 | 9/2012 | Jarisch et al. |
| 8,307,754 B2 | 11/2012 | Ternite et al. |
| 8,312,806 B2 | 11/2012 | De Graaff et al. |
| 8,327,754 B2 | 12/2012 | Kirschner et al. |
| 8,333,144 B2 | 12/2012 | Boussemart et al. |
| 8,409,646 B2 | 4/2013 | Yoakim et al. |
| 8,431,175 B2 | 4/2013 | Yoakim et al. |
| 8,468,934 B2 | 6/2013 | Epars et al. |
| 8,475,860 B2 | 7/2013 | Colantonio et al. |
| 8,512,776 B2 | 8/2013 | Yoakim et al. |
| 8,567,304 B2 | 10/2013 | Saxton et al. |
| 8,613,248 B2 | 12/2013 | Steenhof et al. |
| 8,616,117 B2 | 12/2013 | Evers et al. |
| 8,651,012 B2 | 2/2014 | Yoakim et al. |
| 8,656,827 B2 | 2/2014 | Vanni |
| 8,658,232 B2 | 2/2014 | Yoakim et al. |
| 8,695,484 B2 | 4/2014 | Mori |
| 8,733,229 B2 | 5/2014 | Jarisch et al. |
| 8,752,478 B2 | 6/2014 | Nocera |
| 8,758,844 B2 | 6/2014 | Nocera |
| 8,784,915 B2 | 7/2014 | Evers et al. |
| 8,800,433 B2 | 8/2014 | Cahen et al. |
| 8,808,777 B2 | 8/2014 | Kamerbeek et al. |
| 8,813,634 B2 | 8/2014 | Yoakim et al. |
| 8,833,238 B2 | 9/2014 | Hansen et al. |
| 8,844,427 B2 | 9/2014 | Beutlrock et al. |
| 8,846,121 B2 | 9/2014 | Hansen et al. |
| 8,887,622 B2 | 11/2014 | Bentley et al. |
| 8,906,435 B2 | 12/2014 | Kamerbeek et al. |
| 8,931,397 B2 | 1/2015 | Frigeri et al. |
| 8,950,317 B2 | 2/2015 | Tanner et al. |
| 8,956,672 B2 | 2/2015 | Yoakim et al. |
| 8,962,048 B2 | 2/2015 | Gerbaulet et al. |
| 8,974,846 B2 | 3/2015 | Burton-Wilcock et al. |
| 8,978,545 B2 | 3/2015 | Yoakim et al. |
| 8,986,764 B2 | 3/2015 | Yoakim et al. |
| 2003/0145736 A1 | 8/2003 | Green |
| 2004/0244599 A1 | 12/2004 | Wei |
| 2004/0255790 A1 | 12/2004 | Green |
| 2005/0076786 A1 | 4/2005 | Meister et al. |
| 2005/0076787 A1 | 4/2005 | Grant et al. |
| 2005/0076788 A1 | 4/2005 | Grant et al. |
| 2005/0095158 A1 | 5/2005 | Kirschner et al. |
| 2005/0172820 A1 | 8/2005 | Cortese |
| 2005/0188854 A1 | 9/2005 | Green et al. |
| 2005/0223904 A1 | 10/2005 | Laigneau et al. |
| 2005/0241489 A1 | 11/2005 | Kirschner et al. |
| 2006/0075903 A1 | 4/2006 | Dijs |
| 2007/0144355 A1 | 6/2007 | Denisart et al. |
| 2007/0148290 A1 | 6/2007 | Ternite et al. |
| 2007/0158366 A1 | 7/2007 | Van Deer Meer et al. |
| 2007/0261564 A1 | 11/2007 | Suggi Liverani et al. |
| 2008/0041234 A1 | 2/2008 | Cortese |
| 2008/0089982 A1 | 4/2008 | Brouwer et al. |
| 2008/0105131 A1 | 5/2008 | Castellani |
| 2008/0115673 A1 | 5/2008 | Zelioli et al. |
| 2008/0121111 A1 | 5/2008 | Paget et al. |
| 2008/0173181 A1 | 7/2008 | Startz |
| 2008/0245236 A1 | 10/2008 | Ternite et al. |
| 2008/0250936 A1 | 10/2008 | Cortese |
| 2009/0022864 A1 | 1/2009 | Steenhof et al. |
| 2009/0211457 A1 | 8/2009 | Cortese |
| 2010/0147873 A1 | 6/2010 | Tanner et al. |
| 2010/0173056 A1 | 7/2010 | Yoakim et al. |
| 2010/0178404 A1 | 7/2010 | Yoakim et al. |
| 2010/0203208 A1 | 8/2010 | Yoakim et al. |
| 2010/0258010 A1 | 10/2010 | Castellani |
| 2010/0313766 A1 | 12/2010 | Suggi Liverani et al. |
| 2011/0100228 A1 | 5/2011 | Rivera |
| 2011/0113968 A1 | 5/2011 | Schmed et al. |
| 2011/0154993 A1 | 6/2011 | Bertolina |
| 2011/0183055 A1 | 7/2011 | Mariller |
| 2011/0274802 A1 | 11/2011 | Rivera |
| 2011/0277642 A1 | 11/2011 | Mariller |
| 2011/0297002 A1 | 12/2011 | Vitel et al. |
| 2012/0031279 A1 | 2/2012 | Mariller et al. |
| 2012/0055343 A1 | 3/2012 | Remo et al. |
| 2012/0121765 A1 | 5/2012 | Kamerbeek et al. |
| 2012/0148709 A1 | 6/2012 | Kamerbeek et al. |
| 2012/0171334 A1 | 7/2012 | Yoakim et al. |
| 2012/0199010 A1 | 8/2012 | Mariller |
| 2012/0207895 A1 | 8/2012 | Rivera |
| 2012/0207896 A1 | 8/2012 | Rivera |
| 2012/0210878 A1 | 8/2012 | Mariller |
| 2012/0251669 A1 | 10/2012 | Kamerbeek et al. |
| 2012/0251670 A1 | 10/2012 | Kamerbeek et al. |
| 2012/0251671 A1 | 10/2012 | Kamerbeek et al. |
| 2012/0312174 A1 | 12/2012 | Lambert |
| 2012/0328740 A1 | 12/2012 | Nocera |
| 2013/0025465 A1 | 1/2013 | Schnyder |
| 2013/0068110 A1 | 3/2013 | Pagano |
| 2013/0149424 A1 | 6/2013 | Fischer |
| 2013/0156898 A1 | 6/2013 | Fisk et al. |
| 2013/0183130 A1 | 7/2013 | Etter |
| 2013/0269535 A1 | 10/2013 | Colantonio et al. |
| 2013/0340387 A1 | 12/2013 | Mariller |
| 2014/0102310 A1 | 4/2014 | Aardenburg et al. |
| 2014/0157993 A1 | 6/2014 | Brouwer et al. |
| 2014/0202338 A1 | 7/2014 | Remo et al. |
| 2014/0220205 A1 | 8/2014 | Kamerbeek et al. |
| 2014/0238249 A1 | 8/2014 | Mariller et al. |

(56) References Cited

U.S. PATENT DOCUMENTS

| | | |
|---|---|---|
| 2014/0302204 A1 | 10/2014 | Evers et al. |
| 2014/0328981 A1 | 11/2014 | Kamerbeek et al. |
| 2014/0360377 A1 | 12/2014 | Yoakim et al. |
| 2015/0060481 A1 | 3/2015 | Murray et al. |
| 2015/0068403 A1 | 3/2015 | Bentley et al. |
| 2015/0093484 A1 | 4/2015 | Kamerbeek et al. |
| 2015/0257580 A1 | 9/2015 | Crarer et al. |
| 2015/0257586 A1 | 9/2015 | DiNucci |

FOREIGN PATENT DOCUMENTS

| | | |
|---|---|---|
| EP | 1521541 B1 | 7/2003 |
| EP | 1631176 B1 | 5/2004 |
| EP | 1208782 B1 | 8/2004 |
| EP | 1522241 A2 | 4/2005 |
| EP | 1829467 A2 | 9/2007 |
| EP | 1502528 B1 | 5/2008 |
| EP | 1653832 B1 | 10/2008 |
| EP | 1912542 B1 | 2/2009 |
| EP | 1854384 B1 | 12/2009 |
| EP | 2210539 A2 | 7/2010 |
| EP | 2000062 B1 | 8/2010 |
| EP | 2004028 B1 | 8/2010 |
| EP | 2413754 B1 | 1/2013 |
| FR | 2842090 A1 | 1/2004 |
| WO | WO 02/43541 A1 | 6/2002 |
| WO | WO 2007/016977 A1 | 2/2007 |
| WO | WO 2007/017455 A1 | 2/2007 |
| WO | WO 2007/045553 A1 | 4/2007 |
| WO | WO 2007/110842 A2 | 10/2007 |
| WO | WO 2007/138457 A2 | 12/2007 |
| WO | WO 2009/016444 A2 | 2/2009 |
| WO | WO 2010/081311 A1 | 7/2010 |
| WO | WO 2010/136601 A1 | 12/2010 |
| WO | WO 2011/051867 A1 | 5/2011 |
| WO | WO 2011/138723 A1 | 11/2011 |
| WO | WO 2012/123857 A1 | 9/2012 |
| WO | WO 2015/138292 A1 | 9/2015 |
| WO | WO 2015/138293 A1 | 9/2015 |

\* cited by examiner

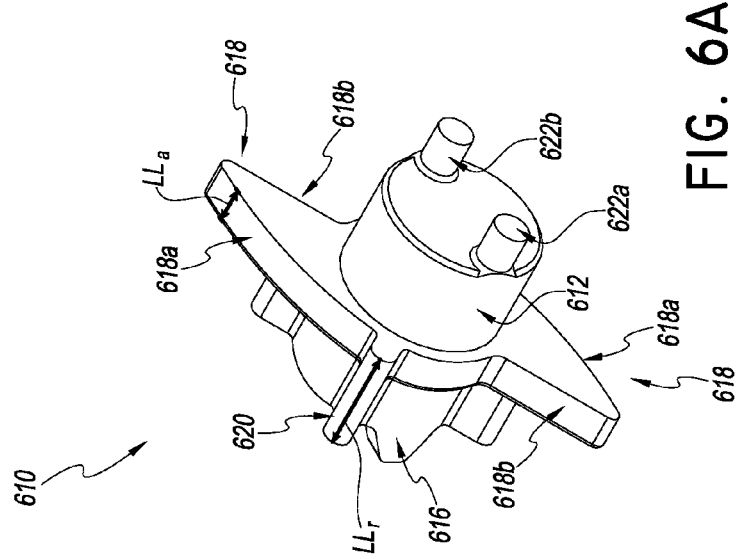
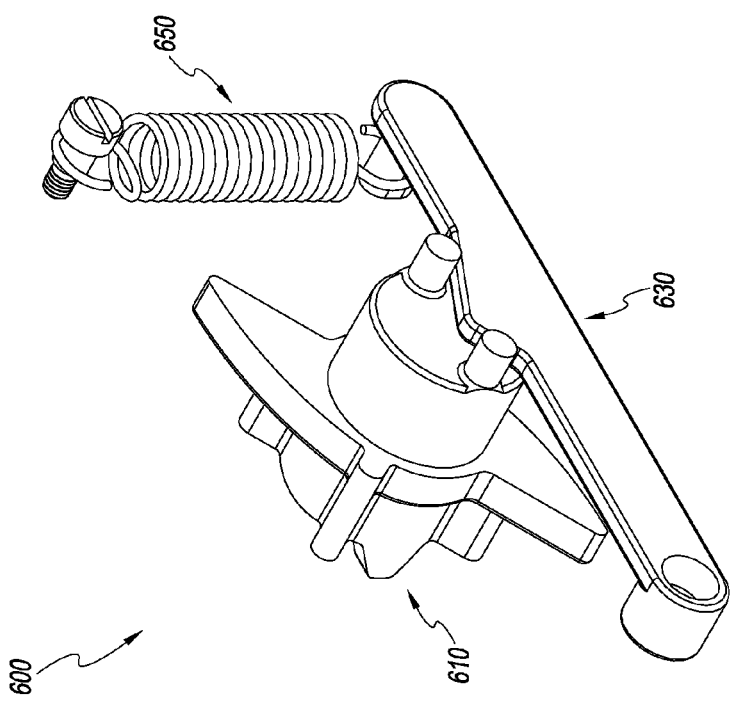

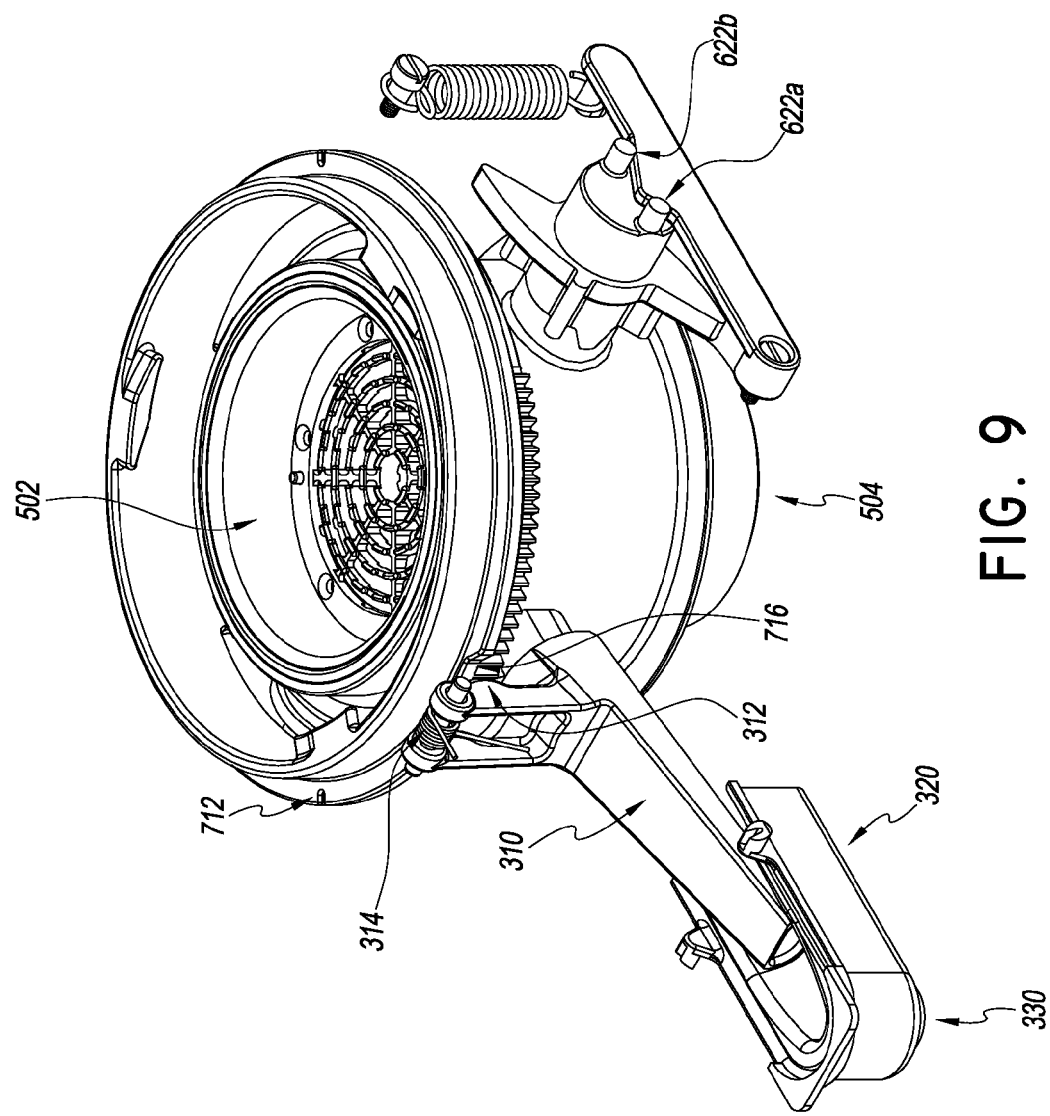

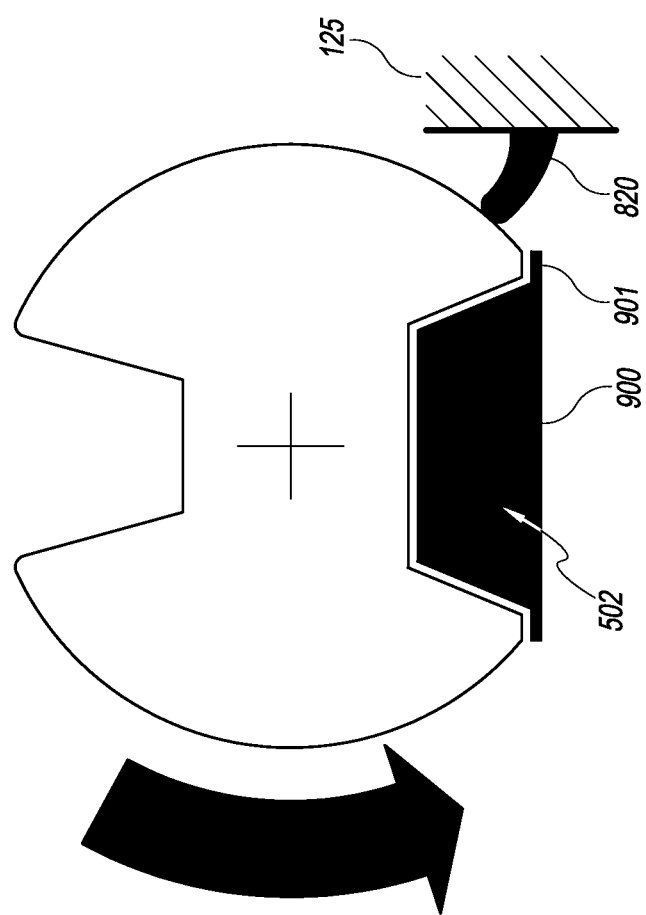

CARTRIDGE EJECTION SYSTEMS AND METHODS FOR SINGLE-SERVE BEVERAGE PRODUCTION MACHINES

RELATED APPLICATIONS

This application is related to at least United States (U.S.) application Ser. No. 14,205,198, titled "SINGLE-SERVE BEVERAGE PRODUCTION MACHINE," which is filed on the same day as the present application and is U.S. application Ser. No. 14,205,256, titled "BEVERAGE PRODUCTION MACHINES AND METHODS WITH MULTI-CHAMBERED BASKET UNITS," which is filed on the same day as the present application and is U.S. application Ser. No. 14,205,241, titled "BEVERAGE PRODUCTION MACHINES AND METHODS WITH TAMPING ASSEMBLY," which is filed on the same day as the present application and is U.S. application Ser. No. 14,205,232, titled "BEVERAGE PRODUCTION MACHINES AND METHODS WITH RESTRICTORS," which is filed on the same day as the present application and is U.S. application Ser. No. 14,205,197, titled "POD-BASED RESTRICTORS AND METHODS," which is filed on the same day as the present application. The entirety of each of the aforementioned applications is hereby incorporated herein by reference.

BACKGROUND

Field

The present disclosure relates to beverage machines, and more specifically to beverage machines that can receive a cartridge and that can to eject and/or a collect the cartridge.

Description of the Related Art

Single-serve beverage machines are devices that are designed to produce a single serving, or sometimes a single cup, of a desired beverage. In comparison to other types of beverage machines (such as drip coffee makers having a multi-cup carafe), single-serve beverage machines can enhance convenience by reducing the time to prepare the beverage.

Some single-serve beverage machines use a cartridge or capsule containing one or more beverage components or precursors to produce the beverage. Generally, such cartridges are received in the single-serve beverage machine, are used to produce the single serving of the beverage, and are subsequently manually removed from the machine and discarded.

BRIEF DESCRIPTION OF THE DRAWINGS

Various embodiments are depicted in the accompanying drawings for illustrative purposes, and should in no way be interpreted as limiting the scope of the embodiments. Furthermore, various features of different disclosed embodiments can be combined to form additional embodiments, which are part of this disclosure.

FIG. 6 illustrates a perspective view of the ratchet assembly of FIG. 4, including a ratchet member, ratchet follower, and biasing member.

FIG. 6A illustrates a front perspective view of the ratchet member of FIG. 6.

FIG. 9 illustrates a perspective view of the beverage production assembly of FIG. 4 in a configuration for dispensing the second type of beverage.

FIGS. 10A-13A illustrate side views of the beverage production assembly of FIGS. 10-13, respectively.

FIG. 16 illustrates another embodiment of a brew basket unit with another cartridge ejection mechanism.

DETAILED DESCRIPTION OF CERTAIN EMBODIMENTS

Figure 1:
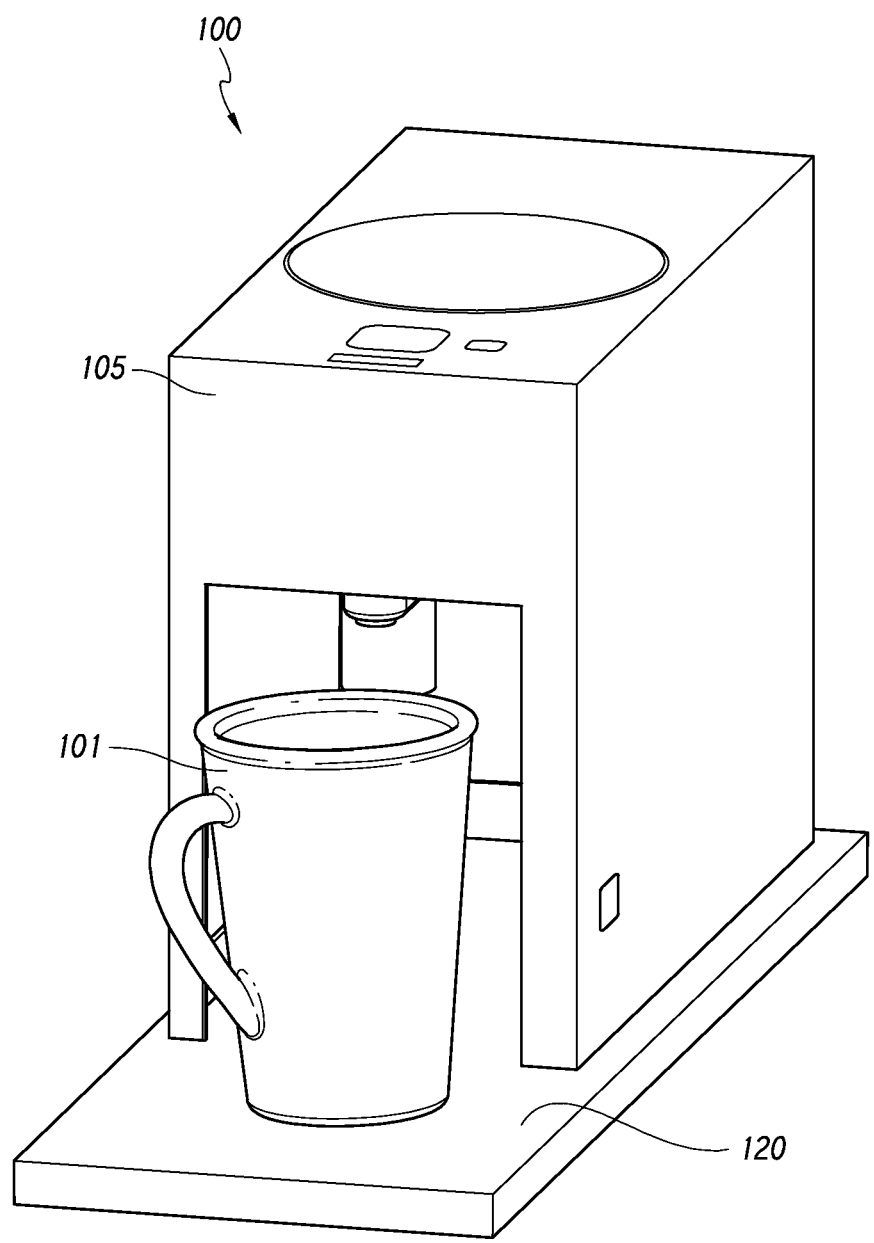
FIG. 1 illustrates an embodiment of a beverage production machine including a main housing.

Various beverage preparation machines having ejection mechanisms are described below to illustrate various examples that may be employed to achieve one or more desired improvements. These examples are only illustrative and not intended in any way to restrict the general disclosure presented and the various aspects and features of the disclosure. The general principles described herein may be applied to embodiments and applications other than those detailed below without departing from the spirit and scope of the disclosure. Indeed, the present embodiments are not intended to be limited to the particular embodiments shown, but are to be accorded the widest scope consistent with the principles and features disclosed or suggested herein. Certain aspects, advantages, and features of the inventions have been described herein. It is not necessary that any or all such aspects, advantages, and features are achieved in accordance with any particular embodiment. Some embodiments may not achieve the advantages described herein, but may achieve different advantages instead. Any structure, feature, or step in one example is contemplated to be used in place of or in addition to any structure, feature, or step of any other example. No features, structure, or step disclosed herein is essential or indispensable.

Many methods and systems for brewing beverages, such as coffee, are known. In conventional coffee brewing systems, a brewing machine typically brews a relatively large batch of coffee. In commercial settings, a barista may pour cup-sized portions of coffee from the batch when a customer places an order. Such beverage brewing systems are inefficient because coffee may be wasted when not all of the coffee in the batch is ordered or consumed. In addition, such systems may produce coffee having an inconsistent flavor and taste because the coffee is not necessarily brewed when a customer places an order and may not be fresh when consumed.

Automated single-cup coffee brewing systems may be employed to address some of the disadvantages of conventional batch-type coffee brewing systems. Users of automated single-cup coffee brewing systems would benefit from several improvements to those systems, including, but not limited to, reducing the time it takes to brew a single-cup portion or traveler portion of coffee, reducing the labor and time involved in cleaning brewing equipment between brew cycles. Single-cup coffee brewing systems have increased convenience to the user but additional improvements may be realized through the use of an automated ejection and collection mechanism of used or unwanted cartridges.

Certain single-serve beverage machines can accept only a single type of cartridge. For example, some such machines can use only cartridges having a certain configuration (e.g., diameter, height, shape, etc.). This can be problematic because variations in the cartridge configuration can be beneficial. Indeed, in some instances, one cartridge configuration may be suitable for preparing some beverages and another cartridge configuration may be suitable for preparing other beverages. For example, it can be beneficial to prepare brewed drinks using different cartridge configurations, which are useful for different brewing conditions (e.g., different temperatures and/or pressures). For example, brewed coffee drinks and espresso coffee drinks can be produced using different cartridge configurations (e.g., the espresso cartridge having a diameter that is less than a diameter of the brewed coffee cartridge, a height that is greater than the brewed coffee cartridge, and/or being adapted to withstand higher pressures than the brewed coffee cartridge).

Accordingly, some aspects of the present disclosure describe beverage preparation machines comprising a basket unit that is configured to eject a cartridge containing beverage precursor material. For example, some embodiments comprise a chamber configured to receive a cartridge for beverage production. After beverage production, in some implementations, the basket unit is rotatable so that the chamber is inverted. For example, the chamber may be oriented generally upwardly during beverage production and rotated generally downwardly for ejection. In some embodiments, the cartridge may be ejected into a waste bin unit. In some embodiments, the waste bin unit comprises a plurality of containers. For example, the plurality of containers may comprise a first container and a second container wherein the first container is oriented above the second container. In some embodiments, the first container may comprise a perforated floor. A cartridge may comprise a cartridge body and a beverage precursor material substantially contained therein. In some implementations, the perforated floor may be configured to retain the cartridge body and permit the beverage precursor material to enter the second container.

For purposes of the present disclosure and summarizing distinctions from the prior art, certain aspects of the apparatus, systems, and methods have been described above and will be described further below. Of course, it is to be understood that not necessarily all such aspects may be present in any particular embodiment. Thus, for example, those skilled in the art will recognize that the apparatus, systems, and methods may be embodied or carried out in a manner that achieves or optimizes one aspect or group of aspects as taught herein without necessarily achieving other aspects as may be taught or suggested herein. All of these embodiments are intended to be within the scope of the present disclosure herein disclosed.

In some embodiments, a system for ejecting a single-serve beverage cartridge includes a frame and a basket unit rotatable in the frame. The basket unit can have a first side with a cartridge-receiving chamber. The chamber can include an interior with a bottom with an aperture. In some variants, when the basket unit is in a first position, the first side is upwardly oriented, and when the basket unit is in a second position, the first side is downwardly oriented. An engagement member (e.g., a pin) can be positioned within the aperture. In some embodiments, as a cartridge is positioned within the chamber, the pin is engaged (e.g., depressed) by the cartridge when the basket unit is in the first position. In some embodiments, when the basket unit is rotated to the second position the pin pushes the cartridge out of the chamber.

Certain variants of the system include any one, or any combination, of any of the following. The system can include a biasing member (e.g., a spring) to bias the pin towards the interior of the chamber. The ejection mechanism can have a plurality (e.g., three) of additional apertures and a corresponding plurality (e.g., three) of additional pins that extend through the additional apertures. Some variants include a corresponding plurality of additional biasing members. In some embodiments, the apertures are circumferentially spaced apart from each other, such as by at least about: 30°, 45°, 60°, 90°, 135°, 180°, values between the aforementioned values, or otherwise.

In some embodiments, a system for ejecting a cartridge includes a basket unit with a chamber for receiving the cartridge and an ejector for ejecting the cartridge. The chamber can rotate from a first position to a second position. In some embodiments, in the first position the first chamber has an upwardly orientated opening, and in the second position the opening is downwardly orientated. The first position can be located generally above (e.g., vertically higher than) the second position. In some embodiments, the chamber can receive a cartridge in the first position. In some variants, the ejector ejects the cartridge from the chamber when the opening is downwardly orientated.

Some embodiments of the system include any one, or any combination, of any of the following. In some embodiments, the ejector uses gravity to aid in removing the cartridge from the chamber. In certain implementations, the chamber has an interior and a bottom that are in communication with the cartridge when loaded. In some variants, the bottom has an aperture and/or the ejector has a pin configured to extend through the aperture and contact the cartridge to eject the cartridge from the chamber. In certain implementations, the ejector has a biasing member to bias the pin towards the interior of the chamber. The ejector can include pluralities (e.g., three) of additional apertures, pins and biasing members. The apertures can be circumferentially spaced apart, such as by approximately 90 degrees apart from each other. In some variants, the ejector has an inlet configured to allow water to enter the chamber. The ejector can include a lever configured to engage a cartridge such that the cartridge is driven away from the bottom.

In some embodiments, a method for ejecting a cartridge from a brew basket (e.g., a multi-chamber basket) includes inserting a cartridge into a first chamber, rotating the basket such that the first chamber moves from a first position to a second position, and ejecting the cartridge from the first chamber. In some embodiments of the method, ejecting includes allowing gravity to eject the cartridge from the first chamber in the second position. In certain variants of the method, ejecting includes inserting a pin through an aperture in a bottom of the chamber. The pin can engage (e.g., contact) the cartridge to eject the cartridge from the chamber. In some embodiments, ejecting includes inserting water into the chamber to eject the cartridge from the chamber. In certain implementations, ejecting includes using a lever to pry the cartridge from the chamber.

According to some embodiments, a system for ejecting a beverage precursor material from a brew basket includes a basket with a first side opposite a second side and an ejection mechanism. The first side of the basket can be in a first position vertically above a second position. The first side can include a chamber for receiving a beverage precursor material. The ejection mechanism can include an inlet configured to allow water to enter the chamber.

In some embodiments, a system for ejecting a cartridge from a brew basket has a basket with a first side opposite a second side. The first side can be in a first position vertically above a second position. The first side can include a chamber for receiving a cartridge. Some embodiments of the system include an assembly to rotate the first side to the second position. Certain embodiments include an ejection mechanism. In some variants, the ejection mechanism has a lever able to engage (e.g., pry) a cartridge from the chamber. For example, the lever can engage the cartridge such that the cartridge is driven away from the first chamber as the first side is rotated to the second position.

In accordance with certain embodiments, a method for ejecting a beverage precursor material from a brew basket includes inserting a cartridge into a chamber, rotating the chamber from a first position to a second position, and ejecting the cartridge from the chamber (e.g., by advancing a pin positioned in and/or extending through an aperture in a bottom of the chamber).

In certain implementations, a method for ejecting a beverage precursor material from a brew basket includes inserting a beverage precursor material into a first side of a brew basket, rotating the basket such that the first side moves from a first position to a second position, and inserting water into the first side of a brew basket to eject the beverage precursor material.

In some embodiments, a method for ejecting a beverage precursor material from a brew basket includes inserting a beverage precursor material into the brew basket, rotating the brew basket such that the first side moves from a first position to a second position, and prying the beverage precursor material from the brew basket as it is rotated.

In some embodiments, an apparatus for ejecting a cartridge from a multi-chamber basket includes a basket and an ejection mechanism. The basket can move from at least a first configuration to a second configuration. The basket can have a plurality of chambers including at least a first chamber, configured to receive a cartridge, and a second chamber opposite the first chamber. In the first configuration, the first chamber is located in a first position vertically above a second position. In the second configuration, the first chamber is located in the second position. The ejection mechanism can eject the cartridge from the chamber.

Some embodiments of the apparatus include any one, or any combination, of any of the following. The ejection mechanism can use gravity to eject the cartridge from the chamber. The chamber can have an interior and a bottom in communication with a cartridge when loaded. The bottom can include an aperture and the ejection mechanism can have a pin configured to extend through the aperture and engage (e.g., contact) the cartridge to eject the cartridge from the chamber. The ejection mechanism can include a biasing member to bias the pin towards the interior of the chamber. The ejection mechanism can have a plurality (e.g., three) additional apertures, pins, and biasing members. The apertures are spaced at least about 90 degrees apart from each other. The ejection mechanism can have an inlet configured to allow water to enter the chamber. The ejection mechanism can included a lever configured to engage a cartridge such that the cartridge is driven away from the bottom.

In certain embodiments, an apparatus for ejecting a cartridge from a multi-chamber basket has a basket configured to be oriented in at least a first configuration and a second configuration. The basket can have a plurality of chambers including at least a first chamber, configured to receive a cartridge, and a second chamber opposite the first chamber. In the first configuration the first chamber is located in a first position vertically above a second position. In the second configuration the first chamber is located in the second position. The apparatus can include a means for rotating the basket between the configurations and/or a means for ejecting the cartridge from the chamber.

I. Overview

FIG. 1 illustrates a perspective view of an embodiment of a beverage preparation machine 100 that is configured to dispense a beverage into a cup 101 or other vessel. The beverage preparation machine 100 can include one or more of a main housing 105, liquid reservoir 110, and frother unit 115. In some embodiments, one or more of the components of the beverage preparation machine 100 are housed on and/or partially in a tray 120.

The liquid reservoir can be located within or external to the housing 105. The liquid reservoir can be in fluid communication (e.g., via tubing or pipes) with the main housing 105 to provide liquid (e.g., water) stored within the liquid reservoir to a chamber within the main housing 105 where the beverage is prepared. In various embodiments, the liquid is pre-heated before entering the chamber. For example, the liquid may be heated within a separate storage reservoir or within fluid supply lines as the liquid travels to the chamber. The amount of liquid (e.g., water) provided to the chamber from the liquid reservoir may be determined by the beverage recipe. The liquid reservoir may include a water level sensor configured to determine whether enough liquid is present in the liquid reservoir to prepare a requested beverage. The frother unit can cause the beverage to be dispensed with a froth of bubbles (e.g., a frothed milk). After dispensing a brewed beverage into the cup 101, the frothed liquid (e.g., frothed milk) can be poured into the beverage. The frother unit may include a control input to toggle the frothing on and off.

Figure 2:
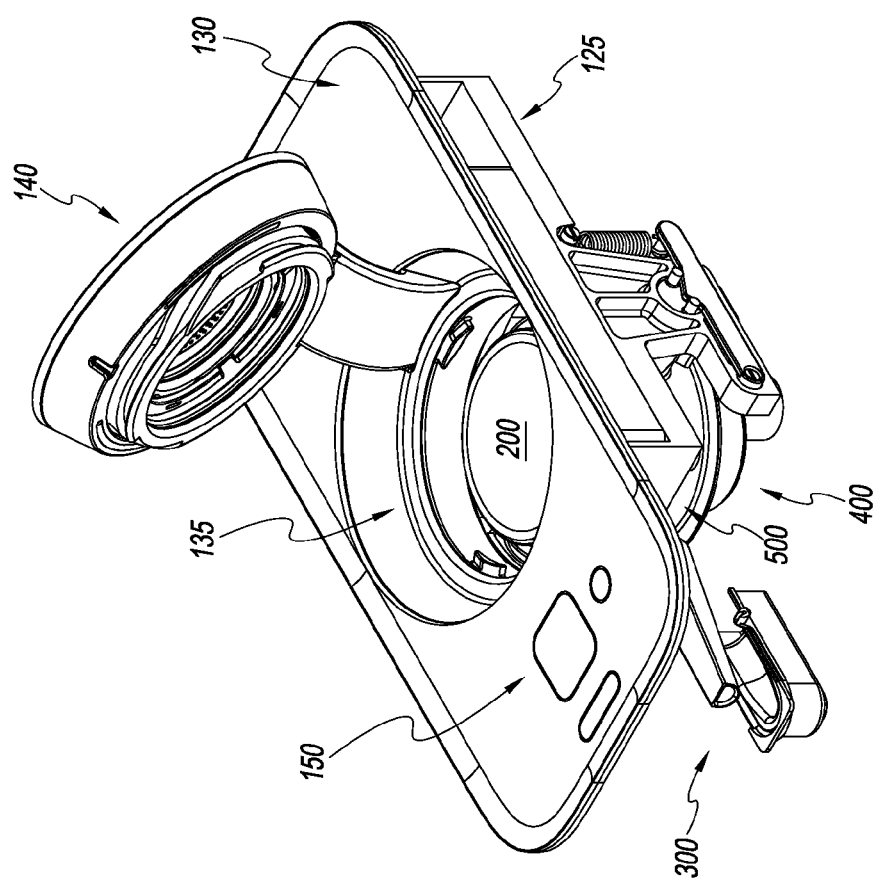
FIG. 2 illustrates a perspective view of an upper portion of the beverage production machine of FIG. 1, with a lid in an open position and a cartridge received in the main housing.
Figure 3:
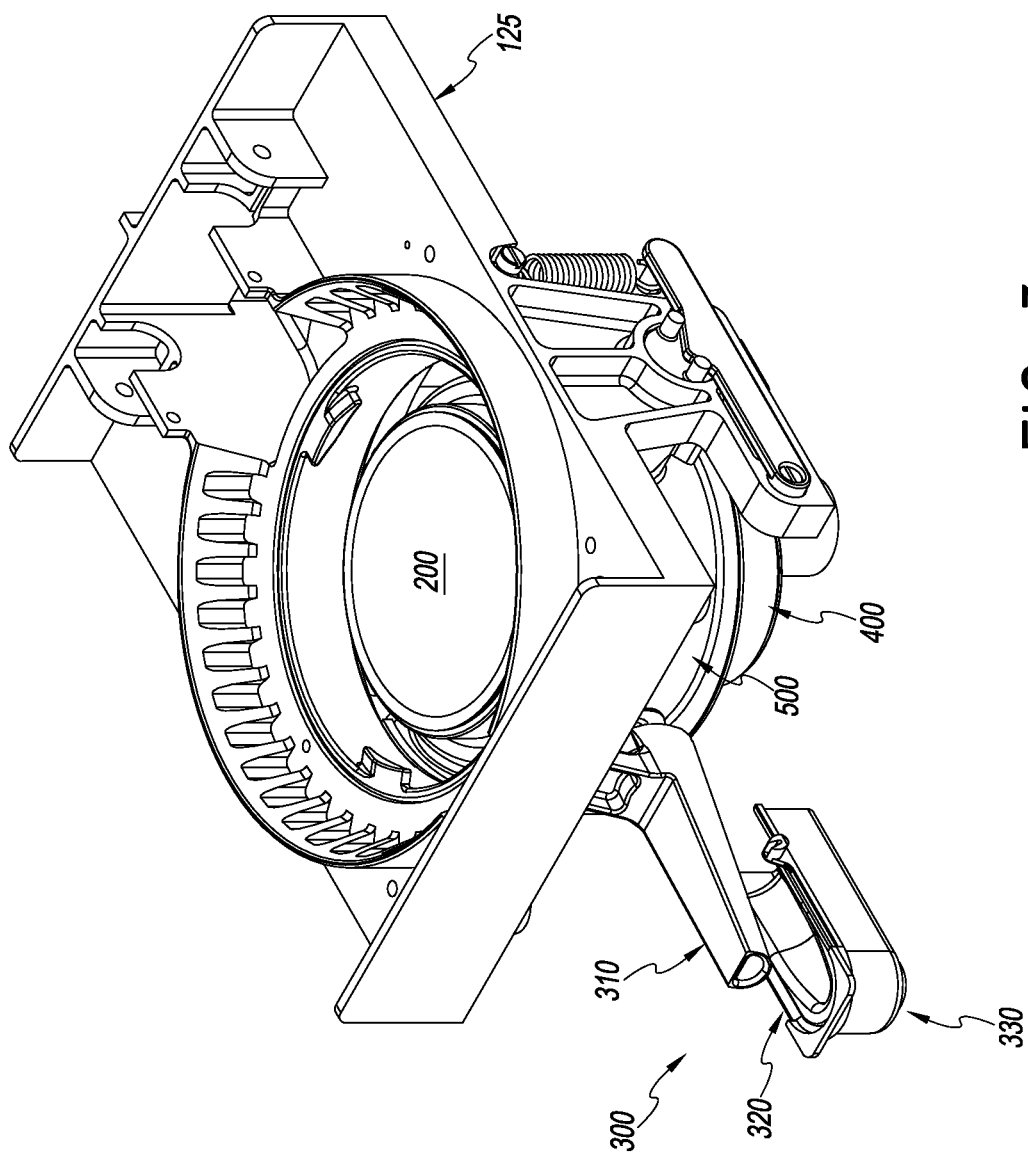
FIG. 3 illustrates a perspective view of a portion of the upper portion of the beverage production machine shown in FIG. 2, with certain features hidden to show a beverage production assembly and a frame.

As shown in FIGS. 2 and 3, the main housing 105 can include a frame 125 that supports a beverage production assembly 400 having a basket unit 500. As also shown, an upper portion of the main housing 105 can include a top 130 with an opening 135 to facilitate the loading of a single-serve beverage cartridge 200 (e.g., a single-serve cartridge with a porous upper and/or lower surface) into the basket unit 500. The opening 135 can be selectively opened and closed with a lid assembly 140. Additional details regarding single-serve beverage cartridges and the lid assembly 140 are disclosed in U.S. application Ser. No. 61/786,072, filed Mar. 14, 2013, and U.S. application Ser. No. 14/191,225, filed Feb. 26, 2014, the entirety of each of which is hereby incorporated by reference.

In some embodiments, a single-serve beverage cartridge includes a cartridge body holding a beverage precursor. The cartridge body may comprise any suitable material, including but not limited to, plastic, metal, wood, bio-degradable polymers, etc. The cartridge body may be reusable, recyclable, biodegradable, compostable, commercially compostable, etc. The beverage precursor may comprise, for example, coffee grounds, tea leaves, powdered milk, milk, juice, tea, coffee, green coffee, green coffee extract, coffee extract, flavorings, other beverage materials, etc.

In various embodiments, the main housing 105 includes an input and output unit 150. For example, the input and output unit 150 can include an indicator (e.g., a light, display, dial, or otherwise) to indicate status information, such as whether the main housing 105 has power, is operating, requires maintenance, etc. The input and output unit 150 can include a user-interface member (e.g., a button or switch) to provide instruction to the main housing 105, such as a command to begin the beverage production process. The input and output unit 150 can be connected with a memory and/or a controller, such as a microprocessor.

In some variants, the input and output unit 150 includes a reader. The reader can be configured to read a code (e.g., optical code, one dimensional bar code, two dimensional bar code, etc.) and/or a tag (e.g., a radio frequency identification (RFID) tag or near field communication (NFC) tag) on the cartridge or associated packaging. This can allow the machine 100 to identify the type of beverage to be produced. For example, reading a cartridge containing espresso coffee ingredients (e.g., grounds) can identify to the machine 100 that an espresso beverage is to be produced. In several implementations, the beverage production assembly 400 is adjusted based on the type of beverage to be produced, as is discussed in more detail below. Additional details regarding the reader, as well as associated functions, are disclosed in U.S. application Ser. No. 14,205,198, titled "SINGLE-SERVE BEVERAGE PRODUCTION MACHINE," which is filed on the same day as the present application and the entirety of that application is hereby incorporated by reference.

In some implementations, when the cartridge 200 has been loaded into the basket unit 500 and the lid assembly 140 has been closed, a beverage preparation process can begin. In some embodiments of the beverage preparation process, liquid (e.g., hot water) is introduced into the cartridge 200 to produce a beverage, such as by a discharge head in the lid assembly 140. The beverage can exit the cartridge 200 and be conveyed to the cup 101 through portions of the main housing 105, such as via a dispensing assembly 300.

Figure 4:
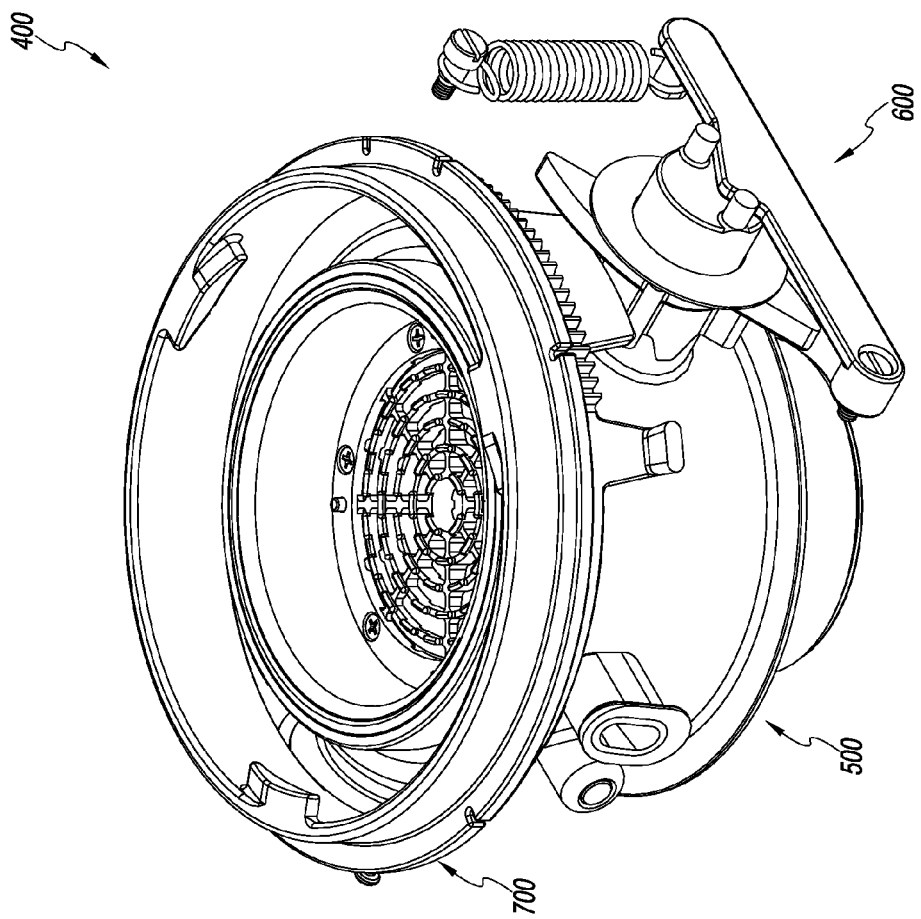
FIG. 4 frame, illustrates a perspective view of the beverage production assembly of FIG. 3 with the frame hidden and the cartridge removed, the beverage production assembly including a multi-chambered basket unit, a ratchet assembly, and a collar.

An embodiment of the beverage production assembly 400 is illustrated in FIG. 4. As noted above, the beverage production assembly 400 can include the basket unit 500. The beverage production assembly 400 can also include a ratchet assembly 600 and/or a collar 700. As discussed in further detail below, engagement between the ratchet assembly 600 and the collar 700 can facilitate movement (e.g., rotation) of the basket unit 500. This can allow the basket unit 500 to be selectively positioned to provide access to a desired chamber in the basket, such as for loading a cartridge.

II. Basket Unit

Figure 5:
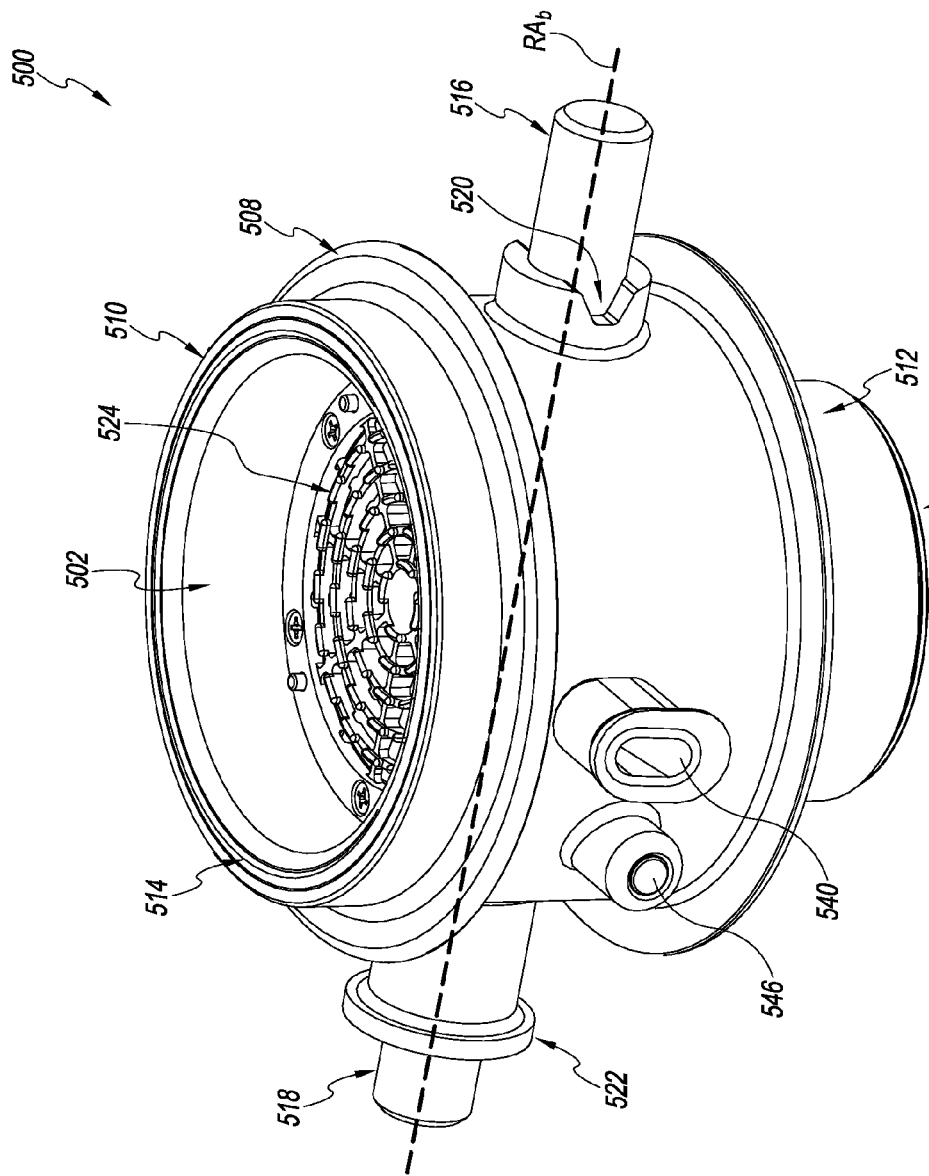
FIG. 5 illustrates a top front perspective view of the basket unit of FIG. 4.
Figure 5A:
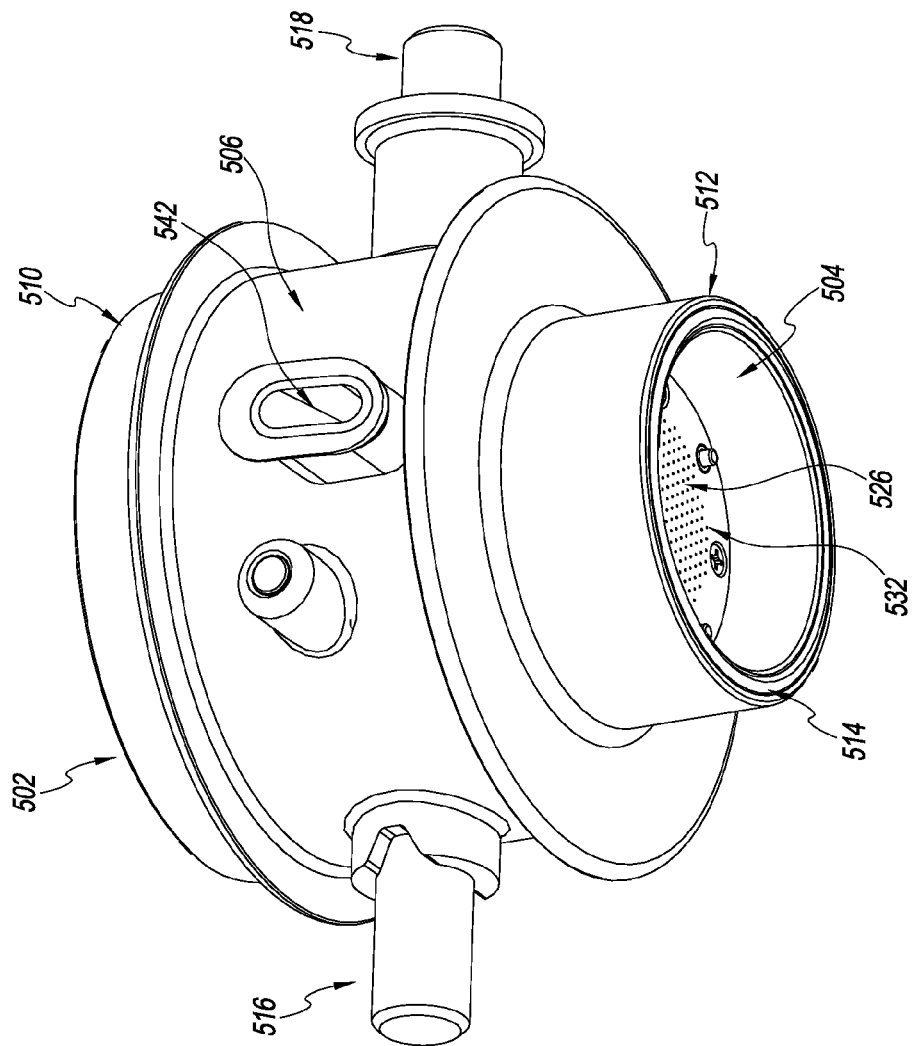
FIG. 5A illustrates a bottom rear perspective view of the basket unit of FIG. 4.
Figure 5B:
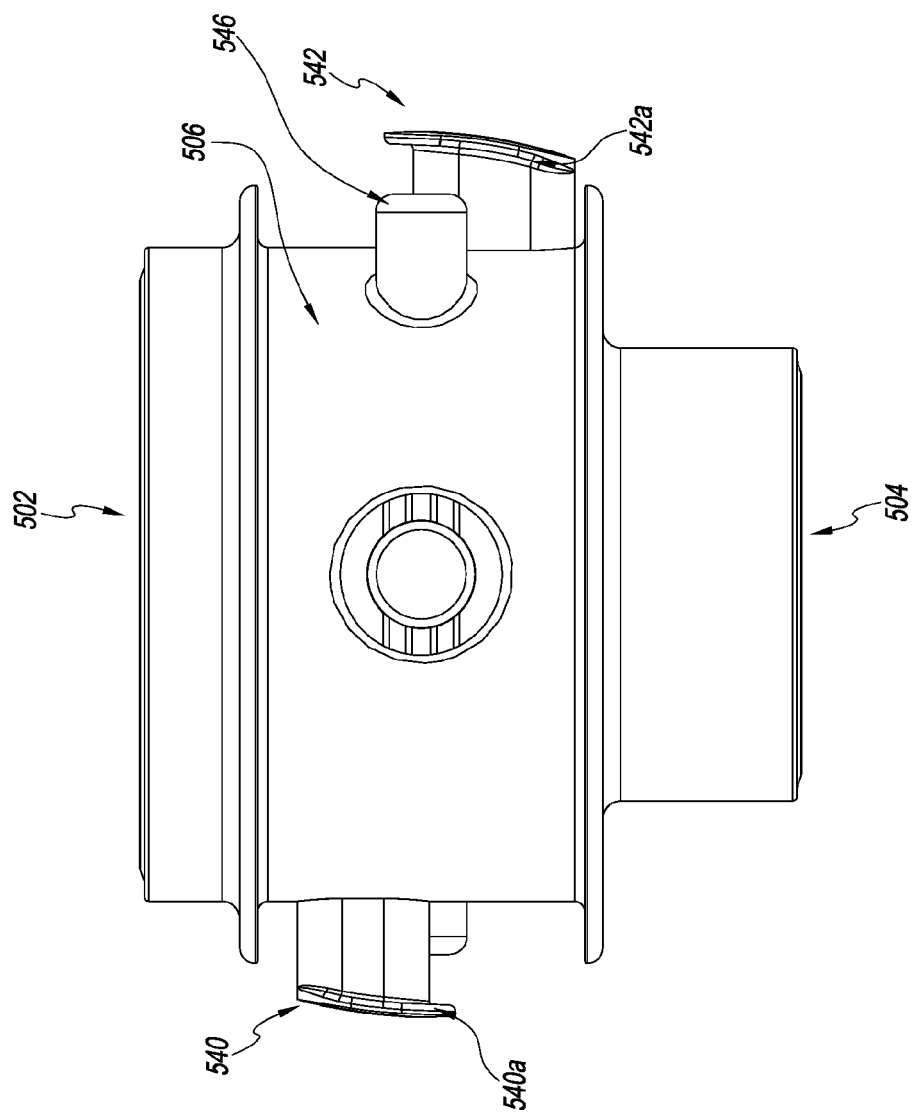
FIG. 5B illustrates a side view of the basket unit of FIG. 4.
Figure 5C:
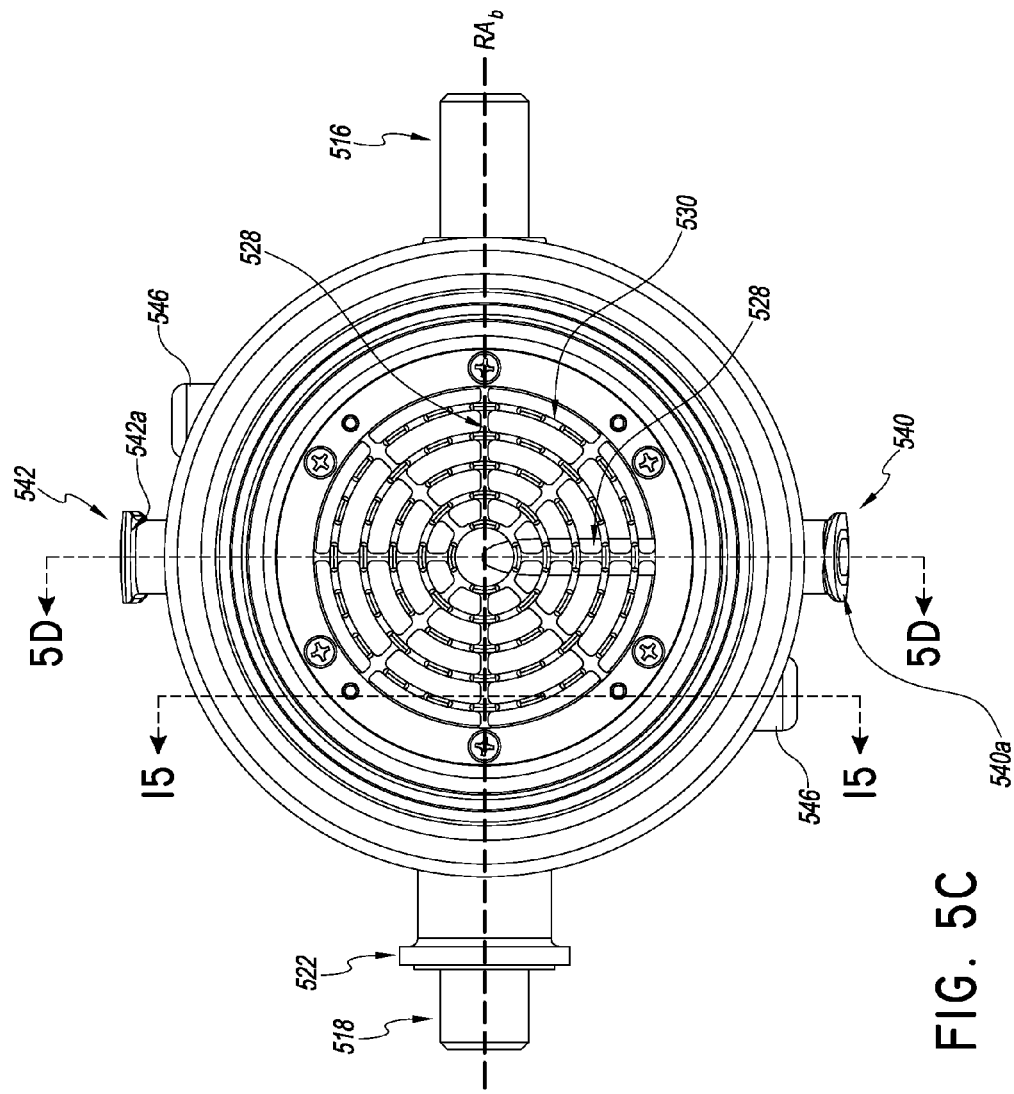
FIG. 5C illustrates a top view of the basket unit of FIG. 4.
Figure 5D:
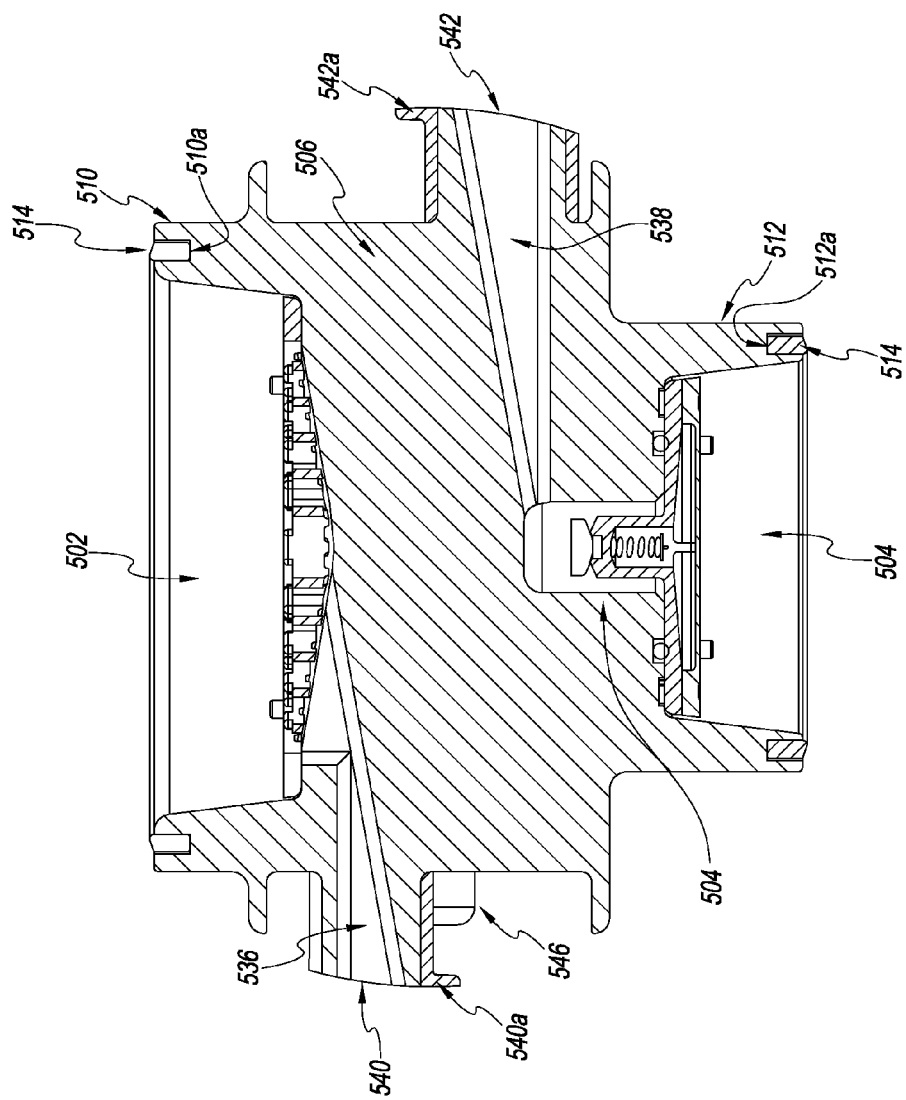
FIG. 5D illustrates a cross-sectional view of the assembly of FIG. 4 taken along the line 5D-5D.

FIGS. 5-5D illustrate an embodiment of the basket unit 500. In some embodiments, the basket unit 500 includes a body portion 506 with a first cartridge-receiving chamber 502 and a second cartridge-receiving chamber 504. As shown, the first chamber 502 can be located on a first side of the basket unit 500 and the second chamber 504 is disposed on a second side of the basket unit 500. For example, the first chamber 502 and the second chamber 504 can be positioned on generally opposite sides of the basket unit 500. Certain embodiments of the basket unit 500 have additional chambers, such as third, fourth, fifth, sixth, or otherwise chambers.

In some implementations, the basket unit 500 includes a body portion 506. The illustrated body portion 506 has a generally cylindrical shape, though many other shapes are contemplated as well. As shown, the first chamber 502 can be positioned at a first end of the generally cylindrical shape and the second chamber 504 can be positioned at a second end of the generally cylindrical shape. In some embodiments, the first and/or second chambers 502, 504 protrude into the body portion 506 (e.g., are recessed within).

In certain variants, the first and second chambers 502, 504 are configured to receive different types of cartridges. For example, the first chamber 502 can be configured to receive a first type of cartridge with a first size and/or shape and the second chamber 504 can be configured to receive a second type of cartridge a second size and/or shape. In some embodiments, the first chamber 502 is adapted for producing a first type of beverage from beverage component or precursor in the first cartridge type, and the second chamber 504 is adapted for producing a second type of beverage from beverage component or precursor in the second cartridge type. For example, first chamber 502 can receive a first type of cartridge containing a beverage component or precursor for the production of a brewed coffee beverage and the second chamber 504 can receive a second type of cartridge containing a beverage component or precursor for the production of an espresso coffee beverage (e.g., latte, macchiato, cappuccino, espresso shot, etc.). In certain variants, the first type of cartridge is for the production of an espresso coffee beverage and the second type of cartridge can be for the production of a brewed coffee beverage. In several implementations, at least one of the chambers 502, 504 is for producing a coffee beverage, such as a brewed coffee or espresso coffee beverage. In certain embodiments, at least one of the cartridges 502, 504 is for producing a non-coffee beverage, such as tea, hot chocolate, fruit or vegetable based drink (e.g., juice, cider, or the like), or otherwise.

In embodiments in which at least one of chambers 502, 504 is for preparing brewed coffee, that chamber may include structural features such as filtration elements, strainers, large exit apertures, etc. configured to facilitate brewing of coffee grounds. In embodiments in which at least one of chambers 502, 504 is for preparing espresso coffee, that chamber may be smaller in size (e.g., diameter, volume, or otherwise) than the brewed coffee chamber. In some implementations, the chamber for preparing espresso coffee beverages may include structural features configured to prepare the espresso beverage at a higher pressure than the brewed coffee beverage (for example, the espresso coffee chamber may include very small exit apertures or may be configured to receive a tamp that compresses the grounds in the cartridge). In some embodiments, the chamber for preparing espresso coffee beverages is configured to withstand at least about 130.5 psi (about 9 bar) of pressure and the chamber for preparing brewed coffee beverages is configured to withstand less than 130.5 psi of pressure (e.g., about 5 psi of pressure). In some embodiments, the chamber for preparing brewed coffee beverages is configured to withstand pressures of at least about 3 psi and/or less than or equal to about 4 psi. In some implementations, the chamber for preparing espresso coffee beverages is configured to withstand at least about 195 psi and/or the chamber for preparing brewed coffee beverages is configured to withstand at least about 4.5 psi.

The cartridges to be received in each such respective chambers may also include different structural features to facilitate preparation of different types of beverages. For example, a cartridge for use in preparing an espresso or other high pressure type beverage may be configured may to withstand a higher pressure being applied to its contents, rather than a cartridge used for preparing a brewed type coffee or other low pressure type beverage, in order to prepare an espresso beverage rather than a brewed coffee beverage. Thus, an espresso or "high pressure" cartridge may include a stretchable lid (for receiving a tamp that compresses the grounds in the cartridge), may include smaller exit apertures, or may be smaller in size, while a brewed coffee or "low pressure" cartridge may include large or more exit apertures, may include a non-deformable or stretchable lid, or may be larger in size.

Various embodiments of the basket unit 500 can include one or more bracing elements. For example, some embodiments of the basket unit 500 can include one or more radially outwardly extending annular flanges 508. Certain variants have one or more cartridge support members 510, 512, such as shoulders or walls, that surround a portion of the first and second chambers 502, 504. For example, the embodiment and configuration shown has a generally upwardly extending first wall bounding a portion of the first chamber 502 and a generally downwardly extending second wall that bounds a portion of the second chamber 504. The cartridge support members can be configured to support a cartridge that is received in the chamber, such as by engaging an outwardly-extending lip or flange on the periphery of the cartridge (not shown).

In certain implementations, one or more of the cartridge support members 510, 512 include a sealing member 514, such as a gasket made of plastic, rubber, or another elastomeric material. As shown, the sealing member 514 can be located at an end of the respective cartridge support member 510, 512. In certain variants, the sealing member extends generally vertically. In some embodiments, a portion of the sealing member 514 is received in a recess 510a, 512a in the respective cartridge support member 510, 512.

The sealing member 514 can be configured to facilitate a seal (e.g., a substantially liquid-tight seal and/or substantially gas-tight seal) between the respective cartridge support members 510, 512 and the cartridge. For example, in certain implementations, during the beverage production process the peripheral flange of the cartridge and one of the cartridge support members 510, 512 are pressed together, thereby resiliently deforming the sealing member 514 and providing a closure between the cartridge and the cartridge support member. In some embodiments, a tamping mechanism (e.g., in the lid assembly) depresses the cartridge against one of the cartridge support members 510, 512 (e.g., the cartridge support member oriented generally upwardly). Additional details regarding the tamping mechanism and the sealing member can be found in U.S. application Ser. No. 14/205, 241, titled "BEVERAGE PRODUCTION MACHINES AND METHODS WITH TAMPING ASSEMBLY," which is filed on the same day as the present application and the entirety of that application is hereby incorporated by reference.

With continued reference to FIGS. 5-5D, some embodiments of the basket unit 500 includes features that can facilitate movement (e.g., rotation) of the basket unit 500. For example, in the illustrated arrangement, the basket unit 500 can include first and second axle portions 516, 518. As shown, at least some of the axle portions 516, 518 can have a generally circular cross-section, which can aid in rotation about the axle portions. The axle portions 516, 518 can extend radially outwardly from, and be rigidly attached to, the body portion 506 of the basket unit 500. In some embodiments, the axle portions 516, 518 are positioned opposite each other around the periphery (e.g., circumference) of the body portion 506 and/or are aligned along a common axis $RA_b$. In various embodiments, the axle portions 516, 518 can facilitate rotation of the basket unit 500 about the axis $RA_b$, and relative to other components of the main housing 105, as described in further detail below. In some implementations, the axle portions 516, 518 are formed with the body portion 506 of the basket unit 500. In some variants, the axle portions 516, 518 are part of a unitary axle member that extends through the basket unit 500. In some embodiments, the axle member can be a separate component that fits into a mating cylindrical bore in the basket unit 500, e.g., along the axis $RA_b$.

According to some implementations, at least one of the axle portions includes a mating feature 520, such as a groove, notch, tooth, or otherwise. The mating feature can be configured to engage with a portion of the ratchet assembly 600. In some embodiments, at least one of the axle portions 516, 518 includes a stop member 522, such as a shoulder. The stop member 522 can engage a mating portion (e.g., a hole) of the frame 125 to inhibit or prevent translational movement of the basket unit 500 relative to the frame 125 along the axis $RA_b$.

In various embodiments, the basket unit 500 can include bottom portions 524, 526 that can define a bottom of each of the chambers. In some embodiments, each of the bottom portions 524, 526 are configured to support a cartridge placed in the respective chamber. For example, as shown in FIGS. 5, 5A, and 5C, the bottom portions 524, 526 can include a series or radial struts 528 and/or rings 530, or a perforated surface 532. In some embodiments, one or more of the bottom portions 524, 526 can include a center support, which can intersect with the radial struts 528 and/or one or more of the rings 530. In various embodiments, each of the bottom portions 524, 526 include one or gaps or apertures, which can allow liquid to flow therethrough to exit the respective chambers 502, 504. In some embodiments, each of the bottom portions 524, 526 are secured to the body portion 506 with one or more threads, fasteners (e.g., screws), adhesives, or otherwise.

In some embodiments, one or more of the bottom portions 524, 526 include a restriction assembly 534. The restriction assembly 534 can be configured to facilitate creating or providing an increase in pressure in one or more of the chambers 502, 504 during the beverage production process. This can be beneficial in producing certain types of beverages. For example, producing espresso at under elevated pressure conditions (e.g., about at least 9 bar) can yield an improved beverage. Additional details regarding restriction assemblies can be found in U.S. application Ser. No. 14,205,232, titled "BEVERAGE PRODUCTION MACHINES AND METHODS WITH RESTRICTORS," which is filed on the same day as the present application and the entirety of that application is hereby incorporated by reference.

With regard to FIGS. 5B, 5C, and 5D, each of the chambers 502, 504 can have at least one conduit configured to convey liquid to a corresponding outlet during the beverage production process. For example, a first conduit 536 can fluidly connect the first chamber 502 with a first outlet 540, and a second conduit 538 can fluidly connect the second chamber 504 with a second outlet 542. This can provide a distinct flow path for each of the chambers 502, 504. As shown, in some embodiments, the outlets can extend outward from the body portion 506 in generally opposite directions. For example, the first outlet 540 can extend from a first side of the basket unit 500 and the second outlet 542 can extend from generally the opposite side of the basket unit 500. In various embodiments, the conduits 536, 538 are angled, such that a given conduit is inclined generally downwardly when its associated chamber is oriented generally upwardly. For example, in FIG. 5D, the first chamber 502 is oriented generally upwardly, and the first conduit is inclined generally downwardly. Such inclined conduits 536, 538 can encourage liquid (e.g., a beverage) to exit from the chambers 502, 504. In some embodiments, the first conduit 536 and/or the second conduit 538 can be angled relative to horizontal at least about: 1°, 5°, 10°, 20°, 30°, 45°, values between the aforementioned values, or otherwise.

In some embodiments, one or more of the outlets 540, 542 extend generally perpendicular to the axis $RA_b$. In certain variants, the outlets 540, 542 can extend generally parallel to, or at a slight angle (e.g., less than about 5°, 10°, 15° values between the aforementioned values, or otherwise) relative to the axis $RA_b$ This can facilitate engaging the one or more of the outlets 540, 542 with the dispensing assembly 300 during a rotational operation of the basket unit 500, as is discussed in more detail below. In some implementations, each of the outlets 540, 542 include a mating member, such as a flange 540a, 542a. As shown in the side view of FIG. 5B, the flange can be curved. This can facilitate mating engagement with the dispensing assembly 300.

In some embodiments, the basket unit 500 includes features configured to indicate the position of the basket unit 500 relative to the frame 125 or other portions of the main housing 105. For example, the basket unit 500 can include one or more basket position elements 546, and the main housing 105 can include one or more basket position sensors (not shown) configured to detect the presence of the basket position elements 546. In some embodiments, the basket position elements 546 are magnetic markers and the basket position sensors are magnetic sensors. In certain variants, the basket position elements 546 are light reflective elements and the basket position sensors are configured to emit and detect a light signal (e.g., a light signal reflected off of the basket position elements). In various implementations, the basket position sensors are configured to determine the presence or non-presence of at least one of the basket position elements 546. For example, at least one of the basket position sensors can sense whether at least one of the basket position elements 546 is in close proximity to and/or is facing the basket position sensor.

In some embodiments, the basket position elements 546 are configured to indicate the position of the basket unit 500. For example, in the embodiment illustrated in FIG. 5C, a first basket position element can be located on a first side of the cross-sectional line 5D-5D and a second basket position element can be located on a second side of the cross-sectional line 5D-5D. When the basket unit 500 is rotated about the axis $RA_b$, the position of the basket position elements 546 changes as a function of which chamber is oriented generally upwardly. In some embodiments, one or more basket position sensors can detect the location of the basket position elements 546. For example, the basket position sensors can determine which side of the line 5D-5D that the basket position element that is facing the sensor is located on. This information can be provided to the controller in the machine 100 to monitor the position of the basket unit 500. In some embodiments, when a first sensor detects a first of the basket position elements 546, the first sensor can send a signal the controller indicating that the first side is oriented generally upwardly, and when a second sensor detects a second of the basket position elements 546, the second sensor can send a signal to the controller indicating that the second side is oriented generally upwardly. This can facilitate determining a position of the basket 500 and/or whether and which of the chambers is in the loading position.

III. Ratchet Assembly

FIG. 6 illustrates an embodiment of the ratchet assembly 600, which can be used to rotate the basket unit 500. The ratchet assembly 600 can include one or more of: a ratchet member 610, a ratchet follower 630, and a biasing member 650. In some embodiments, the ratchet member 610 is integrated with the body portion 506 of the basket unit 500.

Figure 6C:
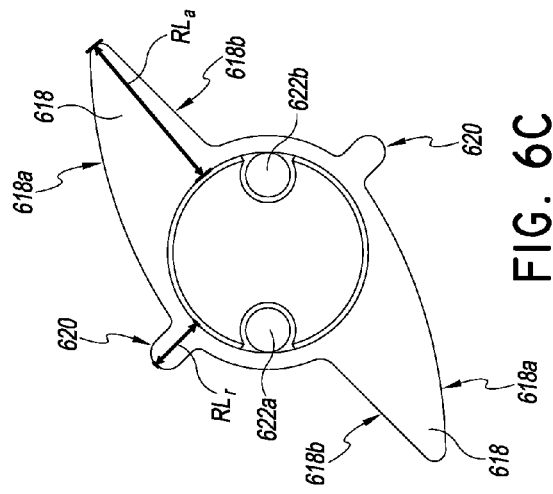
FIG. 6C illustrates a front view of the ratchet member of FIG. 6.
Figure 6D:
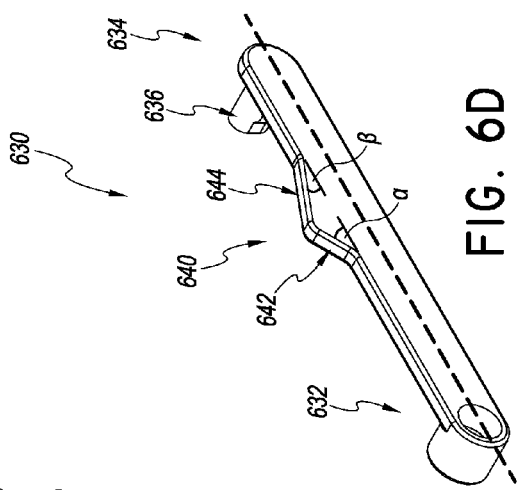
FIG. 6D illustrates a perspective view of a ratchet follower of FIG. 6.
Figure 6B:
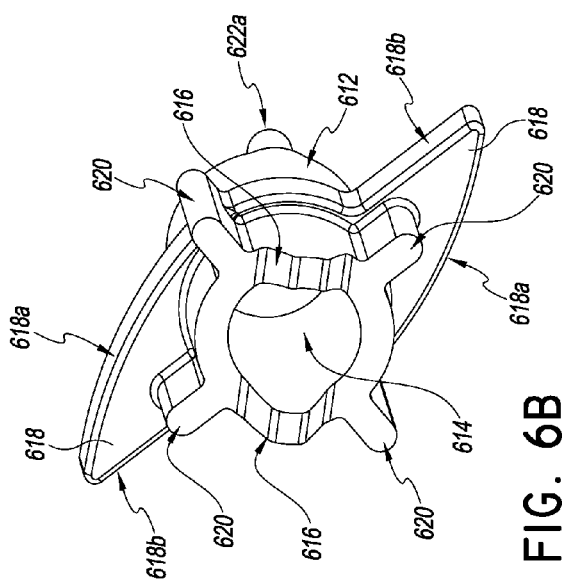
FIG. 6B illustrates a rear perspective view of the ratchet member of FIG. 6.

With reference to FIGS. 6A, 6B, and 6C, an embodiment of the ratchet member 610 is illustrated. In some embodiments, the ratchet member 610 comprises a main portion 612 that is configured to engage with the axle portion 516 of the basket unit 500. For example, the main portion 612 can include a channel 614 configured to receive a portion of the axle portion 516. In some implementations, the main portion 612 is configured to be received in and/or to rotate relative to the frame 125 (see FIG. 3). In some embodiments, the ratchet member 610 includes mating features 616, such as one or more notches, teeth, or otherwise. The mating features 616 of the ratchet member 610 can be configured to engage with the mating features 520 of the basket unit 500. Such engagement can inhibit the ratchet member 610 from rotating relative to the basket unit 500 such that movement of the ratchet member 610 can result in movement of the basket unit 500.

The ratchet member 610 can include one or more collar engaging members, such as arms 618 and/or ribs 620. In some embodiments, the ratchet member 610 includes at least one, two, three, four, five, six, seven, or eight arms 618 and/or at least one, two, three, four, five, six, seven, or eight ribs 620. For example, the embodiment shown includes two arms 618 and four ribs 620. In some implementations, the arms 618 are longitudinally spaced-apart (e.g., in a direction generally parallel to an axis of rotation of the ratchet member) from a rear portion of the ratchet member 610. For example, the arms 618 can be located at a central portion of the ratchet member 610. This can allow portions of the collar 700 to pass behind the arms 618, as discussed in more detail below.

As discussed in more detail below, when some variants are in certain configurations, the ribs 620 can engage with the collar 700. For example, in some embodiments, the ribs 620 engage with the collar 700 when a lid of the lid assembly 140 is in the open position. This can inhibit unintended rotation of the basket unit 500. In certain variants, when the lid is not in the open position, the ribs 620 do not engage with the collar 700, thereby allowing rotation of the basket unit 500.

As illustrated in FIGS. 6A, 6B, and 6C, various configurations of the arms 618 and ribs 620 are contemplated. In certain embodiments, the ribs 620 have a longitudinal length $LL_r$ that is greater than a longitudinal length $LL_a$ of the arms 618. As shown, in some variants, the ribs 620 extend at least from the rear portion of the ratchet member 610 to a front side of the arms 618. In some implementations, a radial length $RL_a$ of one of the arms 618 is greater than the longitudinal length $LL_a$ of that arm. In some embodiments, the longitudinal length $LL_r$ of one of the ribs 620 is greater than the radial length $RL_r$ of that rib. In certain variants, the arms 618 extend from the main portion 612 of the ratchet member 610 in generally opposite directions. This description is a bit confusing. The features 620 are functionally identical as seen in FIG. 6B and are intended to "lock out" rotation of the brew chamber in the unlatched state when they interact with feature 726 on the collar. Features 620 are intended to only interface with feature 726. The long fins identified as feature 618 are intended to only interact with feature 724 found on the collar.

Each of the arms 618 can have a first surface 618a and a second surface 618b. As shown in FIG. 6B, in certain variants, the first surface 618a is curved and the second surface 618b is substantially straight. In some implementations, a first length measured along the first surface 618a is longer than a second length measured along the second surface 618b. In various embodiments, the first surface 618a is configured to facilitate sliding movement of a portion (e.g., a projection) of the collar 700 relative to the ratchet member 610, and/or the second surface 618b is configured to engage and/or move in conjunction with a portion of the collar 700, as discussed in further detail below.

As illustrated in FIG. 6A, the ratchet member 610 can include one or more follower-engaging members, such as projections or bosses 622. In certain implementations the bosses 622 have a substantially circular cross-sectional shape. As shown, certain embodiments include a plurality of bosses 622 that are spaced-apart from each other. For example, the illustrated embodiment includes a first boss 622a and a second boss 622b.

With regard to FIG. 6D, an embodiment of a ratchet follower 630 is shown. The ratchet follower 630 can include an elongate shape. In some embodiments, a first end 632 of the ratchet follower 630 is configured to be fixedly attached to a portion of the frame 125 (see FIG. 3) with a fastener, such as a screw, rivet, pin, or otherwise. In some embodiments, the ratchet follower 630 is biased by the biasing member 650, such as a tension spring, leaf spring, torsion spring, or otherwise. For example, a second end 634 of the ratchet follower 630 can connect to the biasing member 650.

As shown, the second end 634 can include an arm 636 that engages with a hook or loop at an end of the biasing member 650. In some embodiments, a spring element (such as a torsion or compression spring) can be configured to interact on one or more surfaces on the ratchet follower 630 so as to bias the follower in one rotational direction.

As shown, the ratchet follower 630 can include a cam-following portion 640. In certain variants, the cam-following portion 640 includes a first ramp 642 and a second ramp 644. Relative to a longitudinal axis of the ratchet follower 630, the first ramp 642 can be at an angle α and the second ramp 644 can be at an angle β. In various implementations, the angle α is greater than or equal to the angle β. In some implementations, the angle α is less than or equal to the angle β. In some variants, the angles α, β are about equal.

IV. Collar

Figure 7:
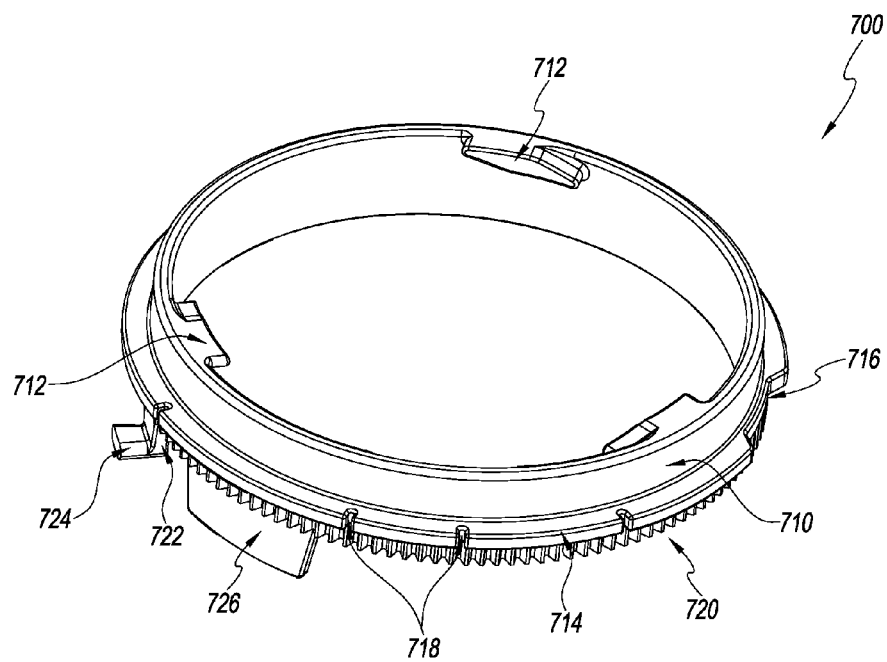
FIG. 7 illustrates a perspective view of the collar of FIG. 4.
Figure 7A:
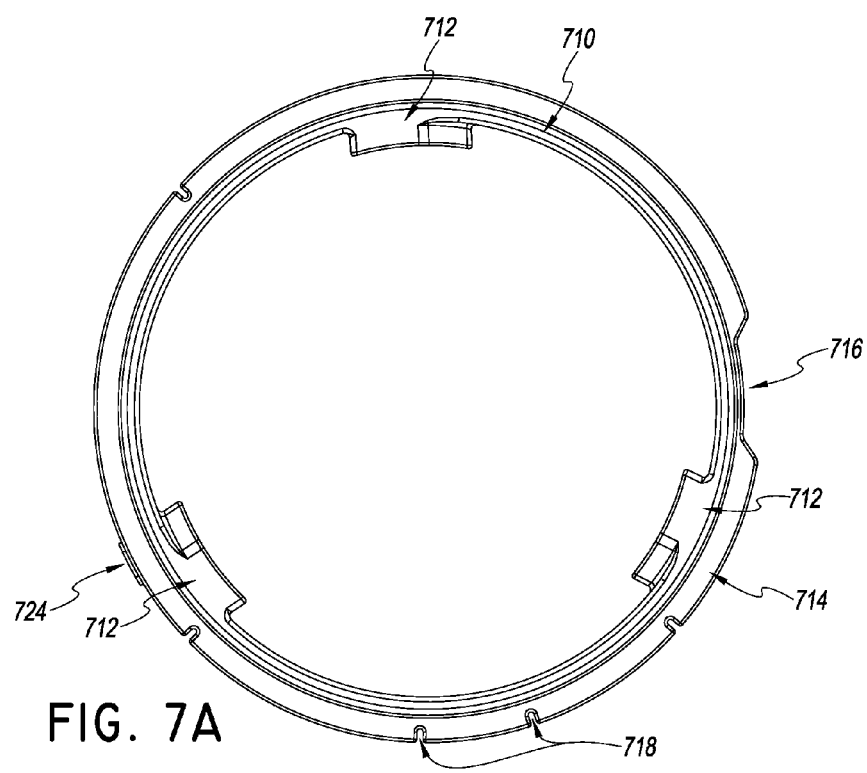
FIG. 7A illustrates a top view of the collar of FIG. 8.

With regard to FIGS. 7 and 7A, an embodiment of a collar 700 is illustrated. The collar 700 can include an annular body with a wall portion 710. In some embodiments, the wall portion 710 includes one or more cam teeth 712. For example, the cam teeth 712 can be positioned on a radially inner side of the wall portion 710. In some embodiments, one or more of the cam teeth 712 engage a cam track (e.g., in the lid assembly, see FIG. 2) to facilitate securing the lid assembly 140 and/or for tamping of the cartridge. Further details in that regard can be found in U.S. application Ser. No. 14/205,241, titled "BEVERAGE PRODUCTION MACHINES AND METHODS WITH TAMPING ASSEMBLY," which is filed on the same day as the present application.

As shown, the collar 700 can include a radially outwardly extending flange 714. In some embodiments, the flange 714 includes a circumferentially-extending notch 716. Certain variants of the flange 714 have one or more position indication features 718, such as tick marks, dimples, or grooves. In some embodiments, the main housing 105 includes a rotation detection sensor (not shown) that is configured to detect the position indication features 718. The sensor can send a signal to the controller in the main housing 105, which can use that signal to discern the rotational position of the collar 700 relative to other portions of the main housing 105 (e.g., the basket unit 500).

In various embodiments, the collar 700 is configured to be rotatably driven by a motor (not shown). For example, the collar 700 can include a plurality of gear teeth 720 adapted to engage with a gear or gear train that engages with a shaft of the motor. The motor can drive the gear or gear train, which in turn rotates the collar 700 about the axis $RA_c$.

Several embodiments of the collar 700 include one or more ratchet engaging members. For example, certain embodiments of the collar 700 include a leg 722 with a projection 724 (e.g., a tab, bump, finger, or otherwise). In some implementations, the leg 722 extends generally downward and/or the projection 724 extends radially outwardly. In some embodiments, the collar 700 includes a wing 726. In some embodiments, the wing 726 is positioned radially inward of the leg 222 and/or the projection 724. As discussed in further detail below, in some variants, to facilitate rotation of the basket unit 500, the projection 724 can be configured to engage with the arms 618 of the ratchet member 610 and/or the wing 726 can be configured to engage with the ribs 620 of the ratchet member 610.

As noted above, when some variants are in certain configurations, the ribs 620 can engage with the collar 700. For example, when the lid is in the open position, the collar 700 can be rotatably positioned such that the wing 726 and the ribs 620 of the ratchet member 610 are engaged. This engagement can inhibit unintended rotation of the basket unit 500. In certain variants, when the lid is not in the open position, the ribs 620 do not engage with the wing 726, thereby allowing rotation of the basket unit 500.

V. Beverage Production Assembly

Figure 8:
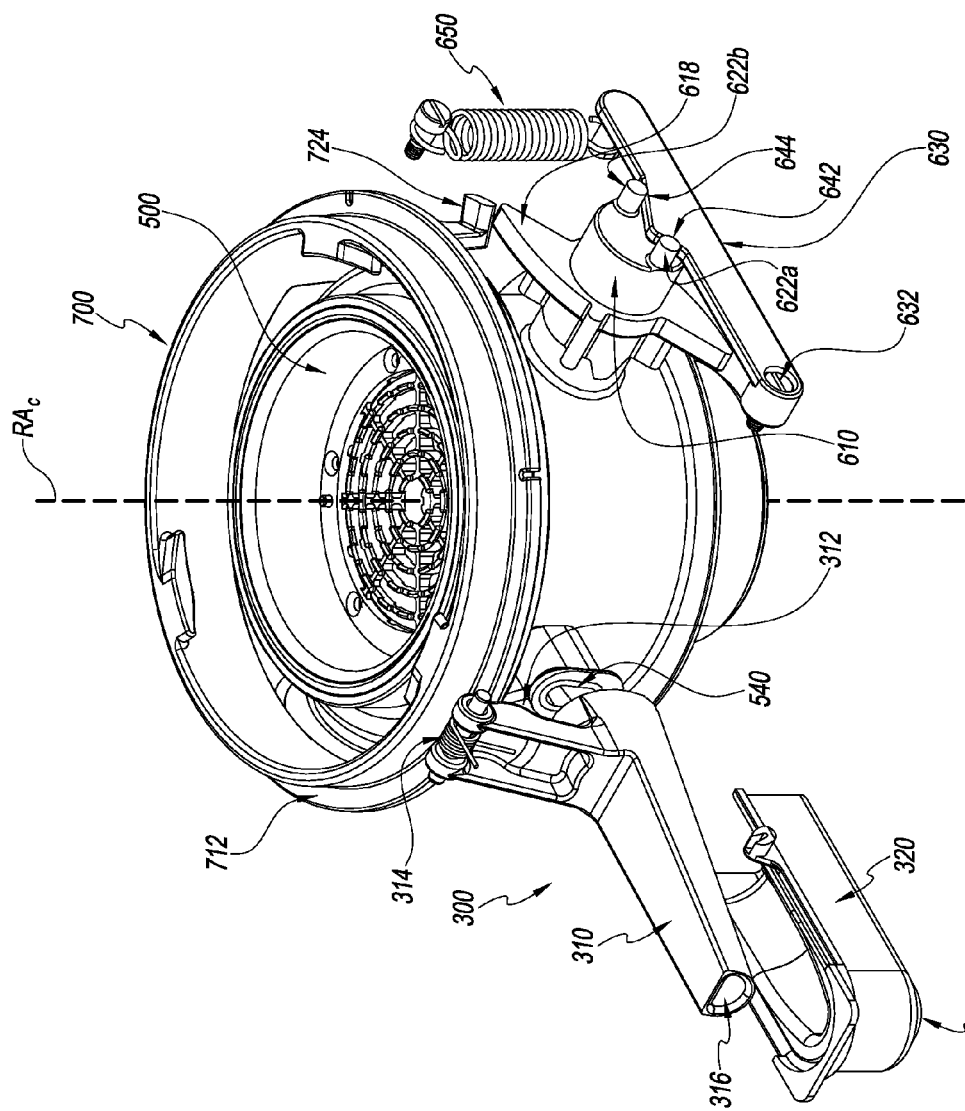
FIG. 8 illustrates a perspective view of the beverage production assembly of FIG. 4 in a position to accept a first type of cartridge for producing a first type of beverage.
Figure 8A:
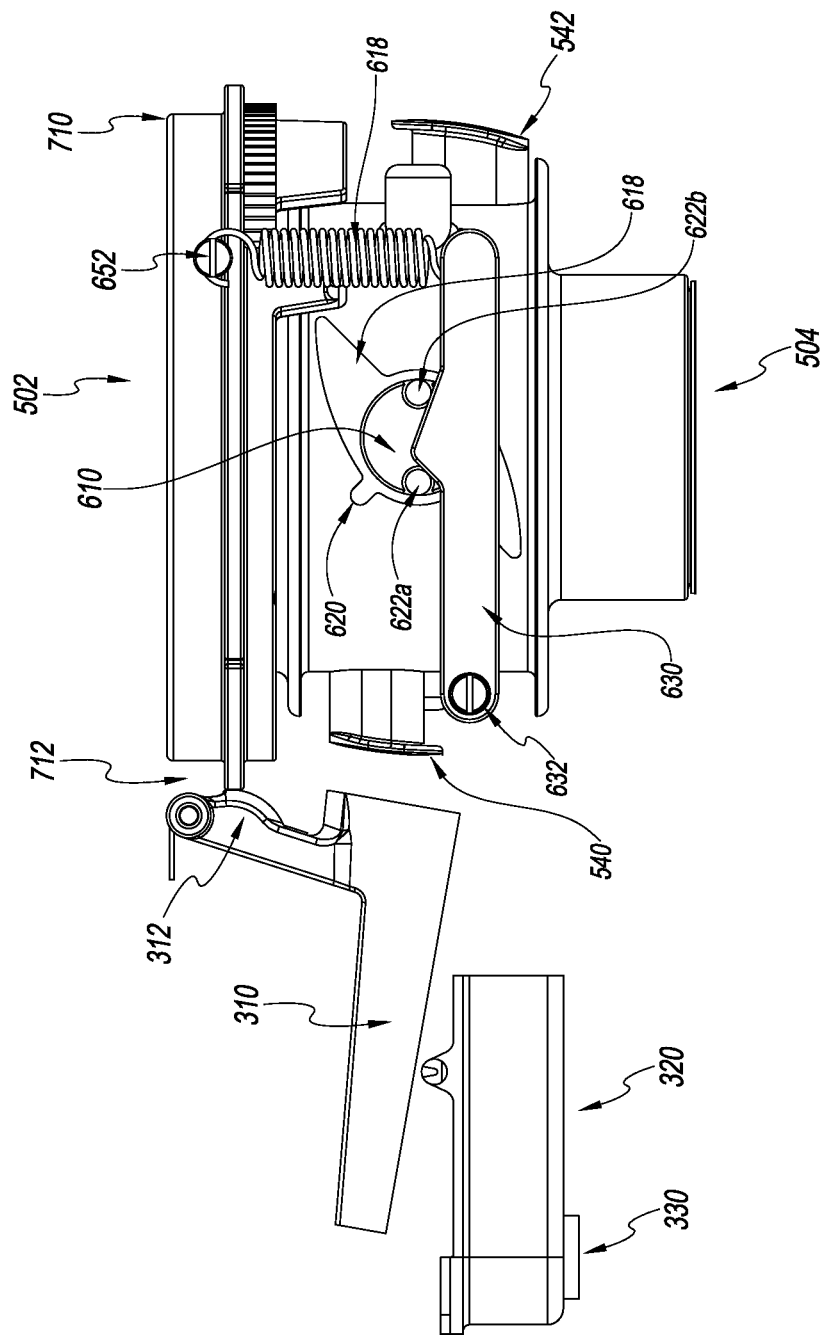
FIG. 8A illustrates a side view of the beverage production assembly of FIG. 8.

With reference to FIG. 8, an embodiment of the beverage production assembly 400 is illustrated. As previously noted, the beverage production assembly 400 can include the basket unit 500, the ratchet assembly 600, and the collar 700. In some variants, the beverage production assembly 400 includes a controller (not shown) configures to receive a signal from and a sensor (not shown). In the embodiment illustrated, the first chamber 502 is oriented generally upwardly and the second chamber 504 is oriented generally downwardly. This can facilitate loading of the first cartridge (e.g., not shown) into the first chamber 502, provided that the lid assembly is open, such as is shown in FIG. 2. As such, the chamber that is oriented generally upwardly is said to be in the "loading position." Also, the cartridge that is oriented generally downwardly can be said to be in the "inverted position." As will be discussed in detail below, the basket unit 500 of the beverage production assembly can be configured to rotate to selectively position one of the first and the second chambers 502, 504 in the loading position and/or to selectively position the other of the first and the second chambers 502, 504 in the inverted position.

In some embodiments, the collar 700 is positioned and adapted such that cartridges can be passed through the collar 700 for receipt into one of the chambers. For example, as shown, the collar 700 can surround an upper portion of the basket unit 500 while also allowing access to the chamber that is in the loading position. In certain variants, an axial centerline of the collar 700 is collinear with a line drawn between the centers of the first and second chambers 502, 504.

As noted above, the beverage production assembly 400 can include a motor (not shown). The motor can be driven (e.g., rotate the collar 700), such as via a gear or gear train. In turn, the collar 700 can drive other components of the beverage production assembly. For example, the collar 700 can engage the ratcheting assembly 600 and/or the dispensing assembly 300, which can result in movement of those components as well as other components (e.g., the basket unit 500). As described in more detail below, rotation of the collar 700 about a rotational axis $RA_c$ can result in one or more of the following: rotational movement of the ratchet member 610 relative to the collar 700, rotational movement of the basket unit 500 relative to the collar 700, pivoting movement of the ratchet follower 630, energizing of the biasing member 650, and pivoting movement of a component of the dispensing assembly 300 relative to the collar 700. As also described below, in various embodiments, the projection 724 and/or the wing 726 of the collar 700 engages the ratchet member 610. In the state shown in FIG. 8, however, the projection and the wing 726 are spaced apart from the ratchet member 610.

As illustrated, the ratchet assembly 600 can engage with the body portion 506 of the multi-chamber basket unit 500. In some embodiments, one of the axle portions 516, 518 is partly received into the channel in the ratchet member 610. As shown, the mating features 616 (e.g., teeth) of the ratchet member 610 can engage with the corresponding mating features 520 (e.g., grooves or notches) in the axle portion 516 of the basket unit 500. In certain implementations, the engagement facilitates a generally rigid connection between the ratchet member 610 and the body portion 506 of the basket unit 500. In various embodiments, the engagement of the ratchet member 610 and the body portion 506 inhibits rotation of the ratchet assembly 600 and the basket unit 500 relative to each other. The engagement can result in rotation of the ratchet assembly 600 being transferred to the body portion 506 of the basket unit 500. This can facilitate rotation of the basket unit 500, as will be discussed in further detail below.

To facilitate clarity of presentation, some components of the upper portion of the main housing are not shown in FIG. 8. For example, the frame 125 and lid assembly 140 are not shown. Nevertheless, some portions of the illustrated components may be connected to the frame 125. For example, a first end 632 of the ratchet follower 630 can be hingedly connected to the frame 125, such as with a fastener (e.g., a screw). This can facilitate hinged movement of a portion of the ratchet follower 630 relative to the frame, other portions of the ratchet assembly 600, or otherwise. In some embodiments, the first end 632 of the ratchet follower 630 is pinned to the frame and the second end 634 of the ratchet follower 630 is able to pivot about the first end 632.

As previously discussed, the arm 636 at the second end 634 of the ratchet follower 630 can be connected with the biasing member 650. As shown, the biasing member 650 can also be connected with a mount or fastener 652, such as a hook or screw, which in turn is connected with the frame. As such, downward pivoting movement of the ratchet follower 630 (e.g., about the first end 632) can energize the biasing member 650, thereby producing a restoring force on the second end 634 of the ratchet follower 630.

VI. Dispensing Assembly

FIG. 8 also illustrates an embodiment of the dispensing assembly 300. In some embodiments the dispensing assembly 300 includes a pivoting member 310, catch member 320, and dispensing nozzle 330. The pivoting member 310 can be pivotally connected with the frame 125 (not shown in FIG. 8 for clarity of presentation). This can allow the rear portion of the pivoting member 310 to rotate into and out of engagement with the outlet ports 540, 542 of the basket unit 500. In certain embodiments, the pivoting member 310 can rotate along an axis that is generally parallel with the axis $RA_b$ and/or generally perpendicular with the axis $RA_c$. In the state illustrated, the pivoting member 310 is spaced apart from the outlet ports of the basket unit 500. This is because the flange 714 on the collar 700 engages with a cam 312 on the pivoting member 310, thereby pushing the pivoting member 310 outward relative to the basket unit 500. In some embodiments, the pivoting member 310 is biased to pivot generally toward the basket unit 500, such as by a biasing member 314 (e.g., a torsion spring).

In various embodiments, the pivoting member 310 includes a passage 316. As discussed in further detail below, the passage 316 can convey liquid beverage from the basket unit 500 to the catch member 320. When the pivoting member 310 is not in a position to convey the beverage to the catch member 320, it can be configured to inhibit dripping outside the machine 105. For example, the pivoting member 310 can be positioned such that the rear portion of the passage 316 is inclined downward and/or away from the catch member 320. This can inhibit or prevent liquid residue in the passage 316 from flowing into the catch member 320, and thus can reduce the chance of unintentional liquid discharge (e.g., drips) from the dispensing nozzle 330. In some embodiments, when the pivoting member 310 is not in a position to convey the beverage to the catch member 320, it can be configured to route drips to a reservoir (not shown), such as a waste bin unit can be located generally or directly below the basket unit 500.

Figure 9A:
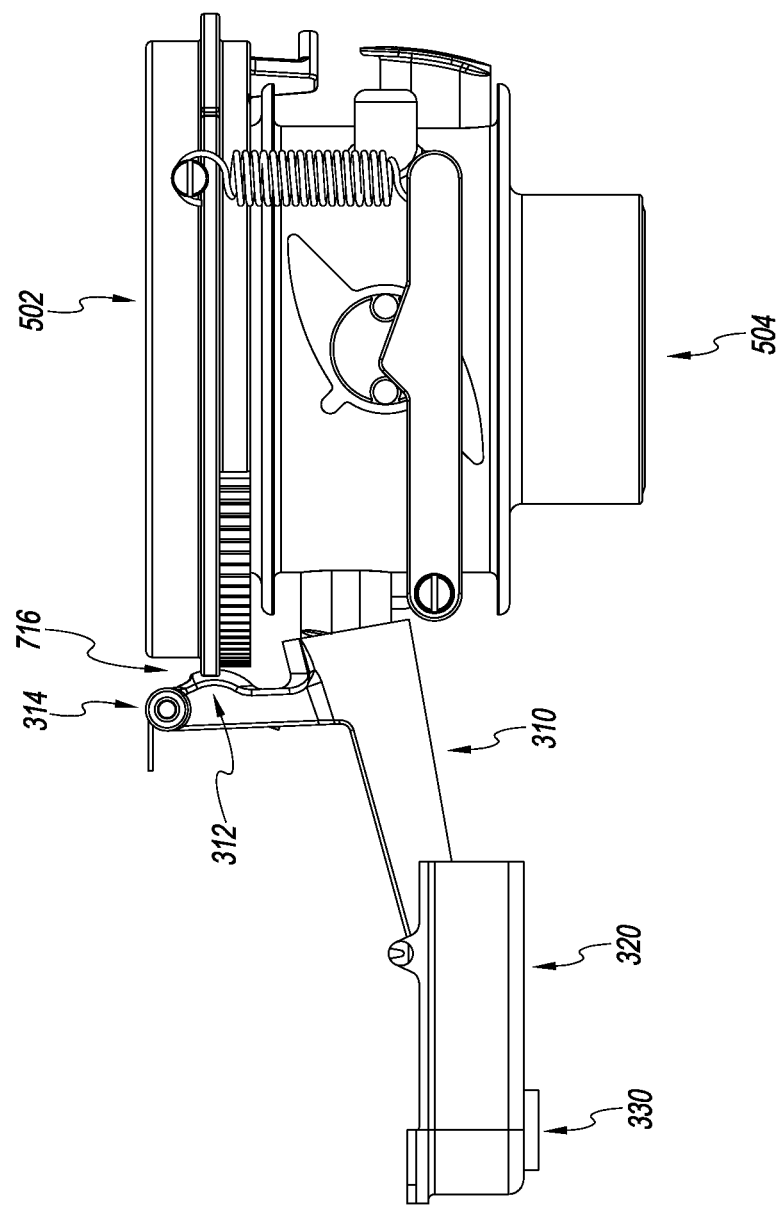
FIG. 9A illustrates a side view of the beverage production assembly of FIG. 9.
Figure 9B:
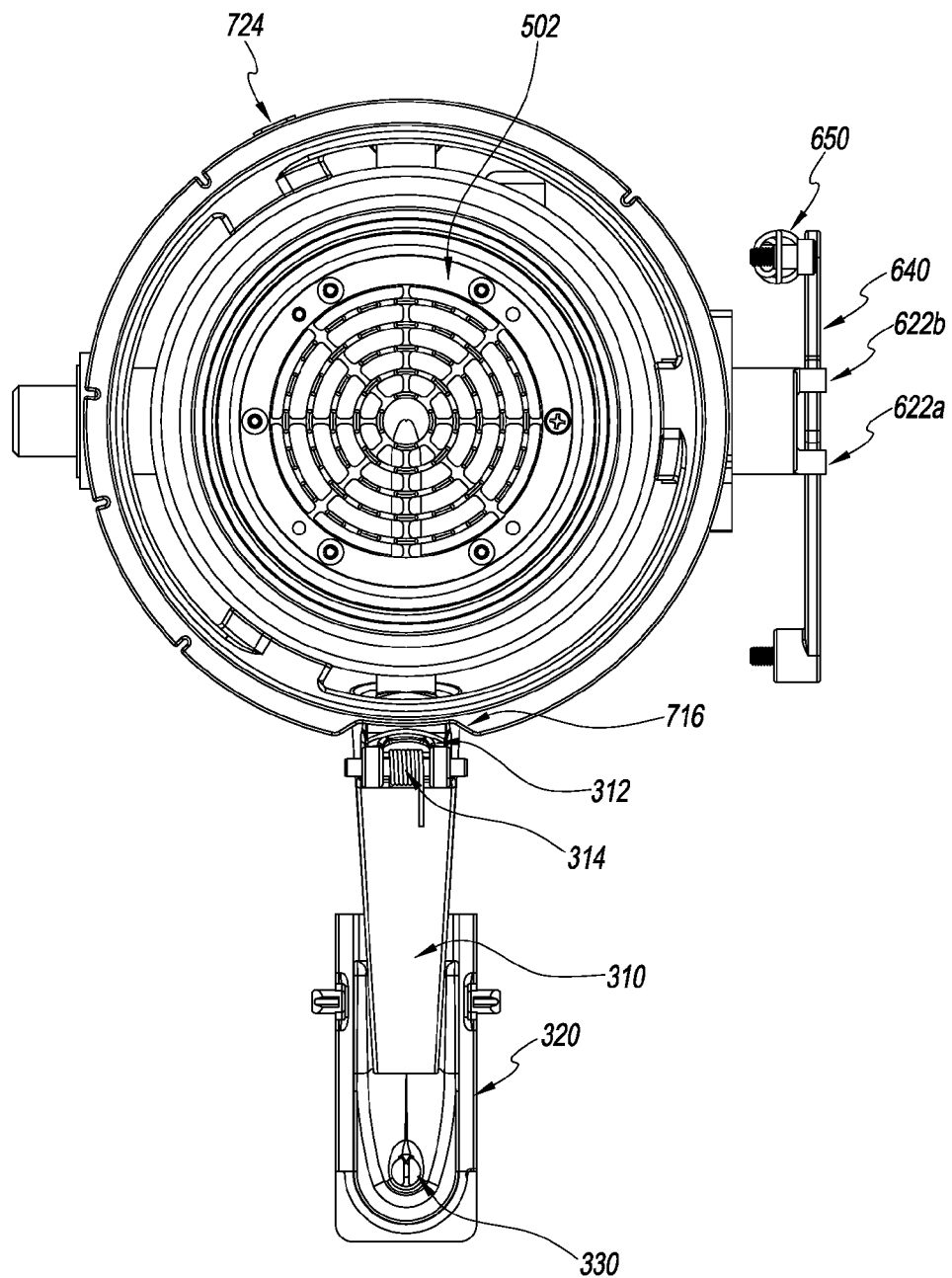
FIG. 9B illustrates a top view of the beverage production assembly of FIG. 9.

With regard to FIGS. 9, 9A, and 9B, the beverage production assembly 400 is shown in a state for dispensing a liquid beverage from the first chamber 502. In this state, the dispensing assembly 300 is in fluid communication with the first outlet port 540 of the basket unit 500. In various embodiments, a liquid (e.g., water) can be introduced into a cartridge (not shown) located in the first chamber 502 to produce the beverage. The beverage can exit the cartridge (e.g., via a porous bottom), pass through the bottom of the first chamber 502, through the first conduit 536, and into the passage in the pivoting member 310. In some embodiments, during the dispensing process, the beverage flows from the basket unit 500 to the dispensing assembly 300 in a direction substantially perpendicular to the axis $RA_b$. In certain variants, during the dispensing process, the beverage flows from the basket unit 500 to the dispensing assembly 300 in a direction that is not perpendicular to (e.g., generally parallel with) the axis $RA_b$.

In some embodiments, whether the dispensing assembly is in fluid communication with the basket unit 500 is a function of the position of the collar 700. For example, in the illustrated embodiment, the collar 700 has rotated into a position such that the notch 716 in the flange 714 of the collar 700 is circumferentially aligned with the cam 312 on the pivoting member 310 of the dispensing assembly 300. This can result in the bias of the biasing member 314 (e.g., torsional spring) encouraging the cam 312 into the notch 716, which in turn can result in the pivoting member 310 moving toward the first outlet port 540 of the basket unit 500. This can provide a fluid communication path between the first outlet 540 of the basket 500 and the passage of the pivoting member 310 of the dispensing assembly 300. As shown, in certain embodiments, the pivoting member 310 can receive some or all of the first outlet port 540 of the basket 500. As shown, the pivoting member 310 is angled downward, thereby allowing the liquid to flow down the passage 316 and into the catch member 320 by force of gravity. The liquid can flow from the catch member 320 to the dispensing nozzle 330 for dispensing to the cup 101 or other vessel.

In certain variants, the catch member 320 is configured to encourage the liquid to flow toward and out of the dispensing nozzle 330. For example, the catch member 320 can be configured to pivot such that an end of the catch member 320 with the dispensing nozzle 330 is lower than an opposite end of the catch member 320. For example, the catch member 320 can include hinge features, such as pins, that pivotally connect with other portions of the machine 100, such as with the frame 125. During the dispensing portion of the beverage preparation process, the catch member 320 can be pivoted (e.g., by an actuator or other mechanism) such that gravity encourages the liquid to flow toward and through the dispensing nozzle 330.

In some implementations, the catch member 320 can include a funnel member 322 in communication with the pivoting member 310 during dispensing of the beverage. The funnel member 322 can be inclined, with a lower portion at or near an inlet 332 of the dispensing nozzle 330, thereby allowing gravity to encourage the liquid to flow toward and out of the dispensing nozzle 332. In certain embodiments, because the funnel member 322 is configured to encourage flow of the liquid in the funnel member 322 during dispensation to the cup 101, the funnel member 322 can reduce the likelihood of liquid remaining in the catch member 320. This can inhibit or avoid dripping from the funnel member 322 and/or the dispensing nozzle 332. In some embodiments, the funnel member 322 includes a low friction material and/or coating, which can reduce the chance and/or amount of liquid residue remaining in the funnel member 322.

VII. Rotation From First Chamber To Second Chamber

FIGS. 10-13A illustrate the beverage production assembly 400 during various stages of rotation of the basket unit 500. Such a rotational movement can facilitate loading a cartridge into the basket unit 500 by orienting a desired one of the chambers 502, 504 generally upwardly, near an upper portion of the machine 105, and/or in a direction generally toward the user. For example, when a beverage that is prepared using the second chamber 504 is desired, but the first chamber 502 is in the loading position, the basket unit 500 can rotate so that the second chamber 504 is in the loading position. This can allow the cartridge to be loaded into the second chamber 504 and the beverage prepared. In some embodiments, the amount of rotation of the basket unit 500 is about 180° (and thus can be called a "half flip" of the basket unit 500).

In some embodiments, rotation of the basket unit 500 can aid in ejecting or otherwise removing a used or unwanted cartridge from one of the chambers 502, 504. For example, after a cartridge that was loaded into one of the chamber has been used to prepare a beverage, that chamber can be rotated to eject the cartridge from the chamber. This is because, as a result of the rotation, the chamber that was in the loading position has been rotated to be generally downwardly oriented position (e.g., the inverted position), thereby facilitating ejection (e.g., by force of gravity or otherwise) of a cartridge in that chamber. In certain embodiments, after ejection of the cartridge from a chamber, liquid (e.g., water) is introduced into that chamber to rinse away debris and/or residual beverage. In certain such implementations, an interior surface of the chamber (e.g., a radially inwardly facing surface) and/or one of the sealing members 510, 512 can be rinsed with the introduced liquid.

Figure 10:
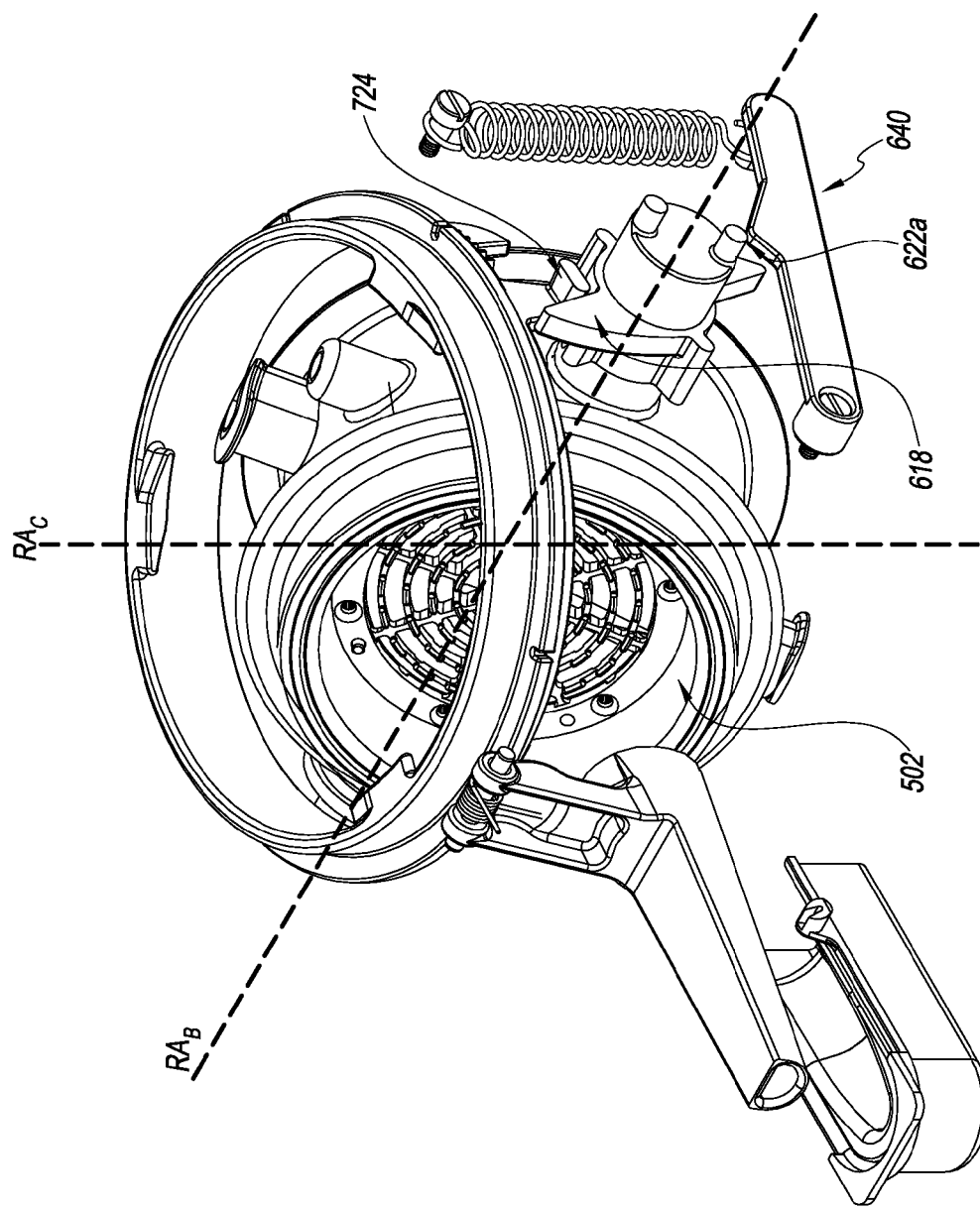
FIGS. 10-13 illustrate perspective views of the beverage production assembly of FIG. 4 in various stages of a rotating operation.
Figure 10A:
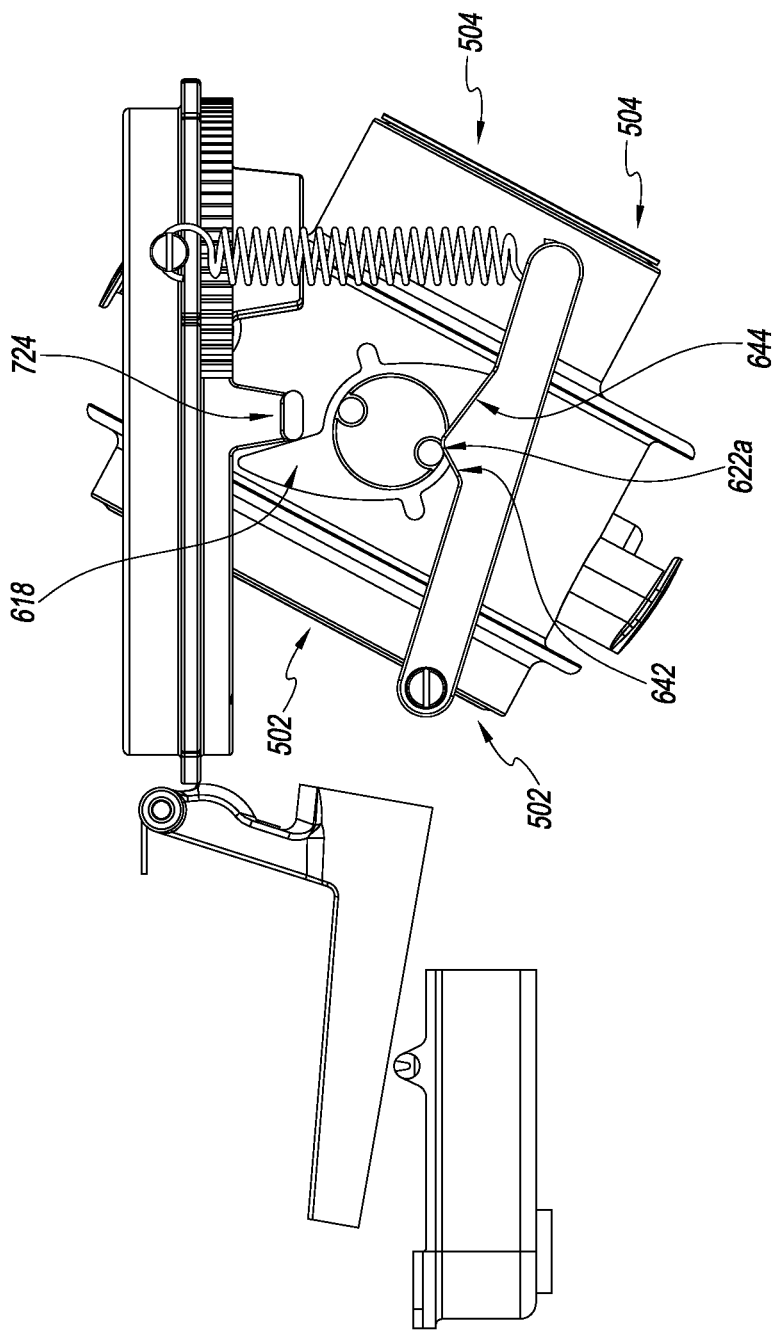
Figure 11:
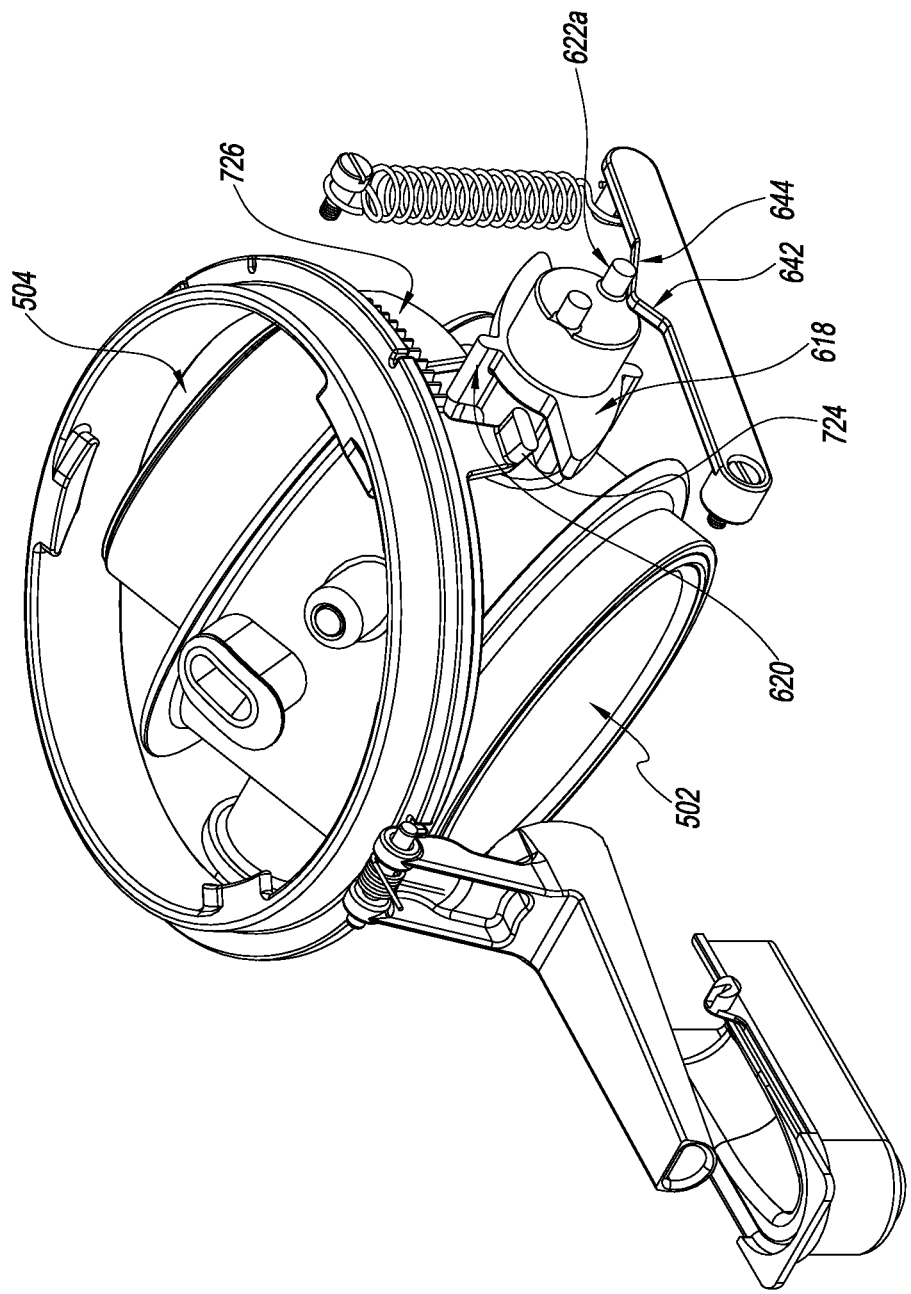
Figure 11A:
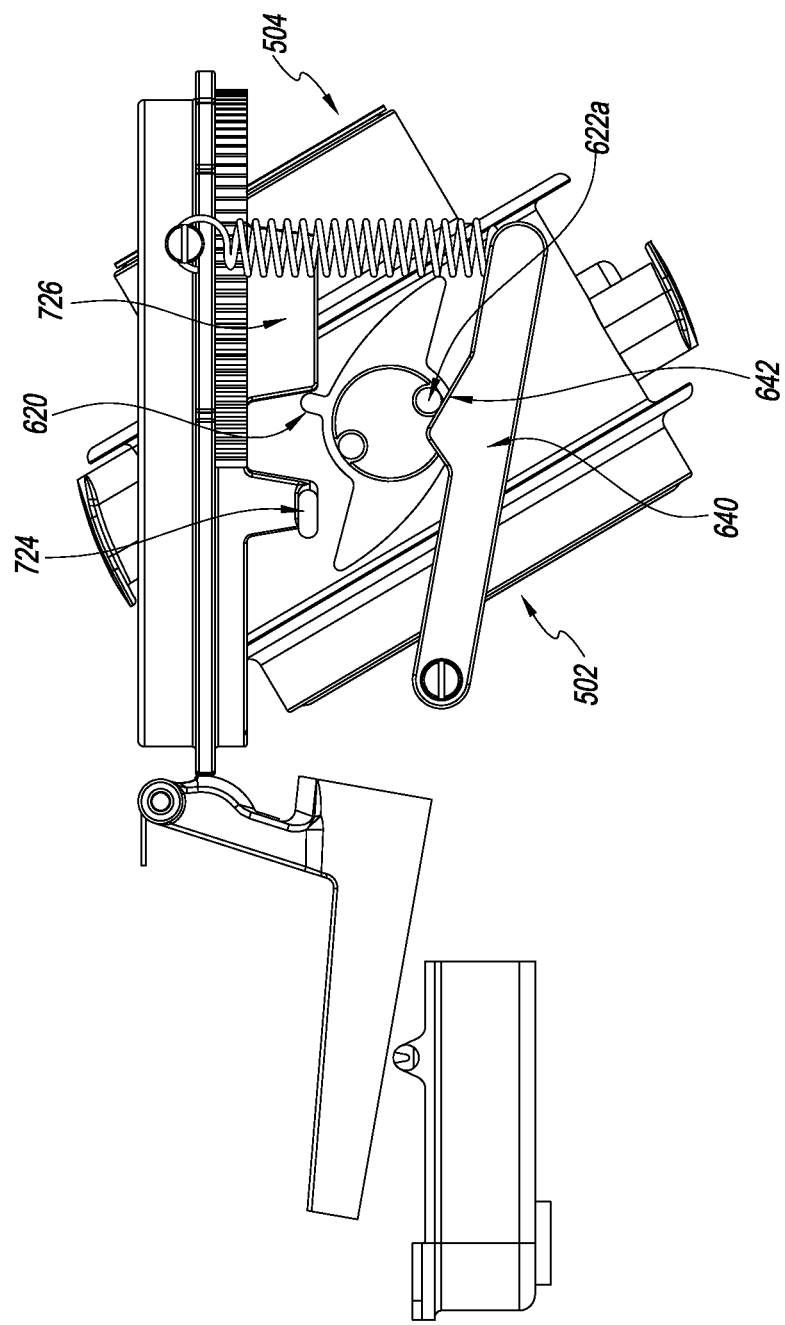
Figure 12:
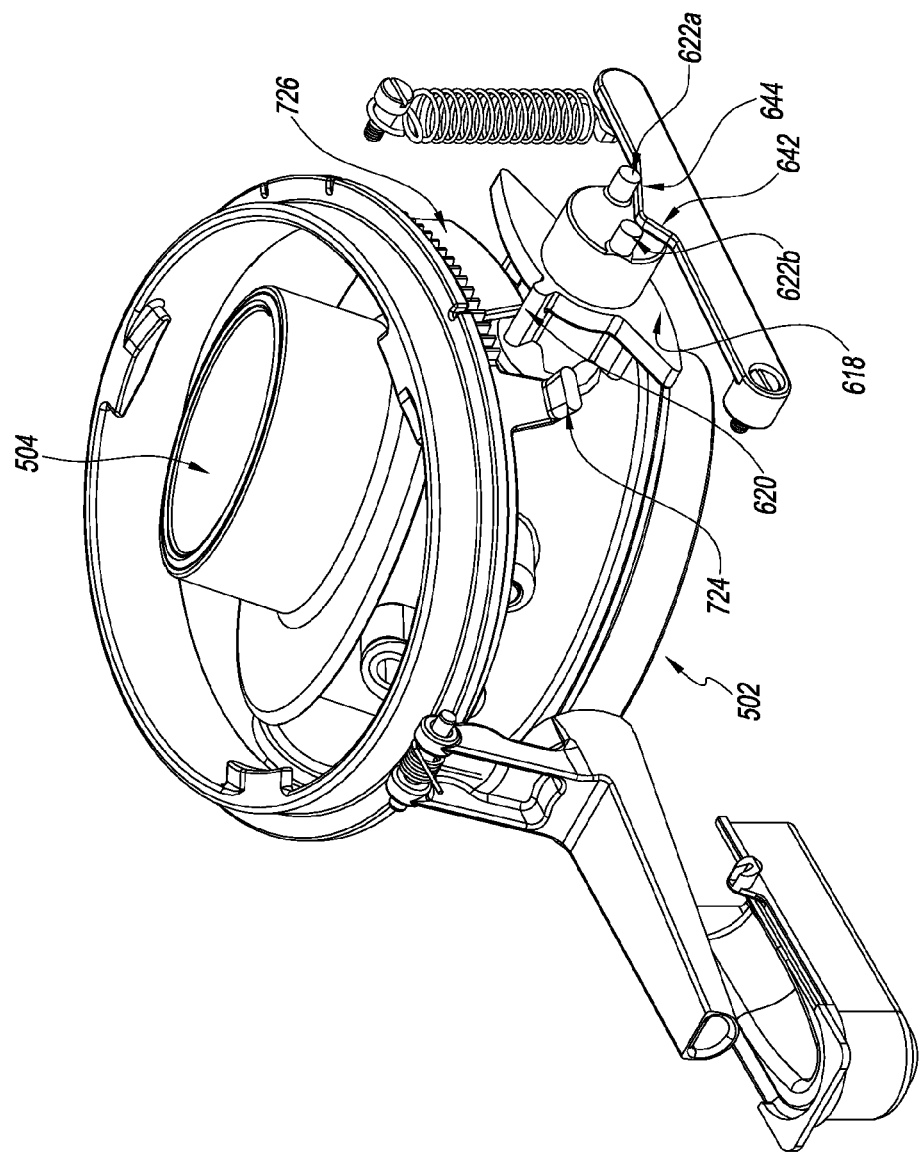
Figure 12A:
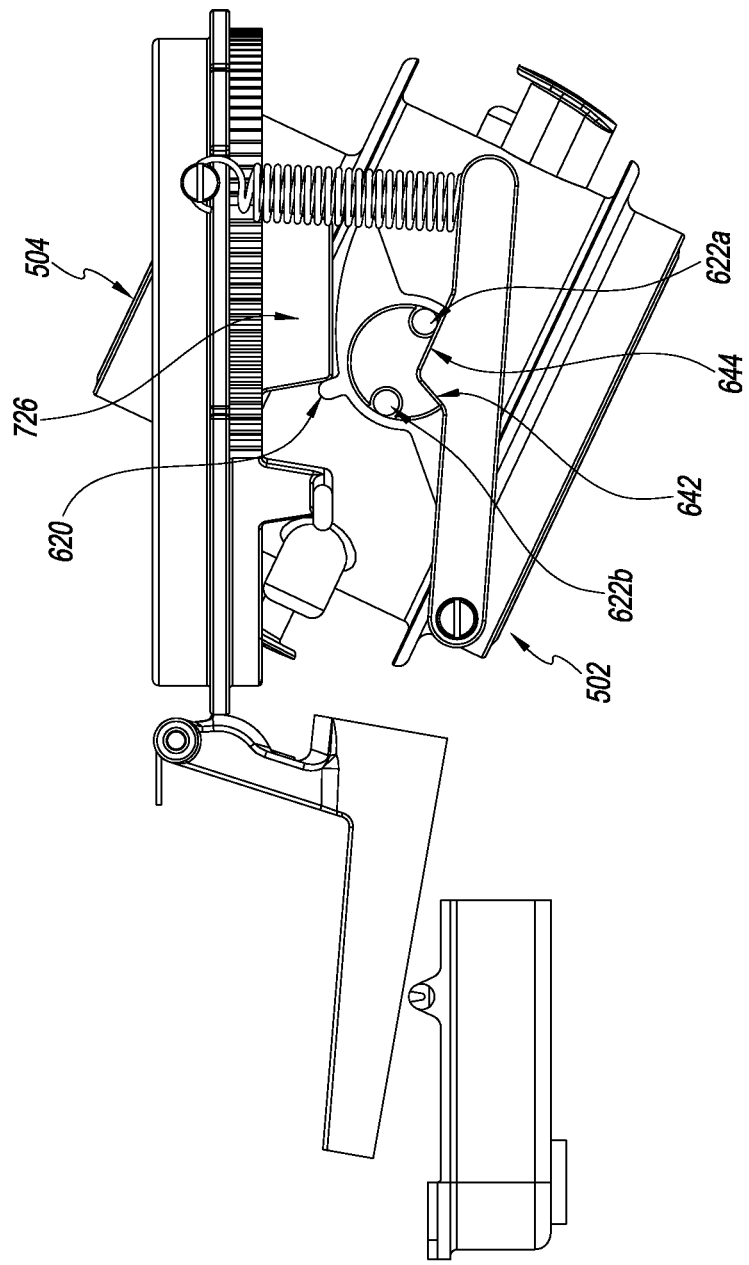
Figure 13:
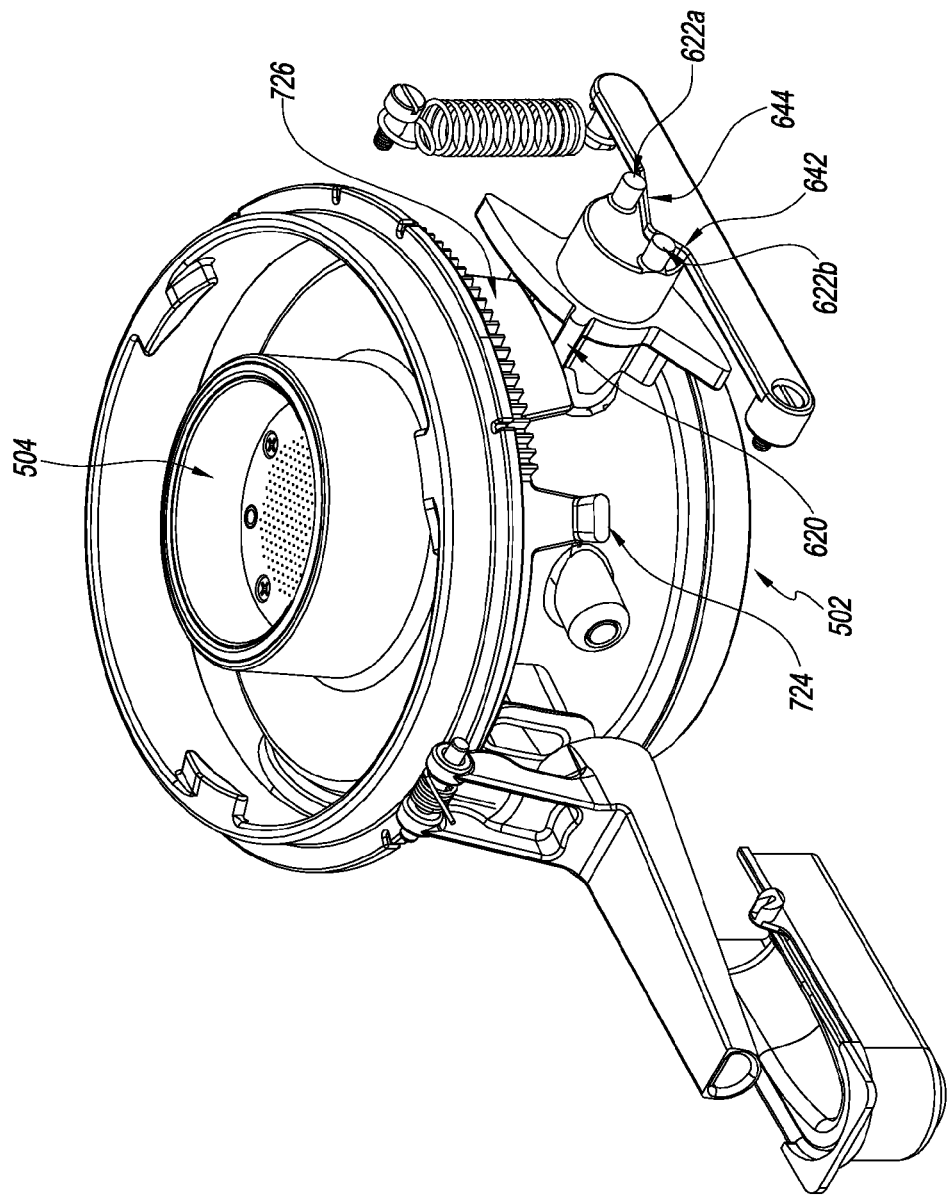
Figure 13A:
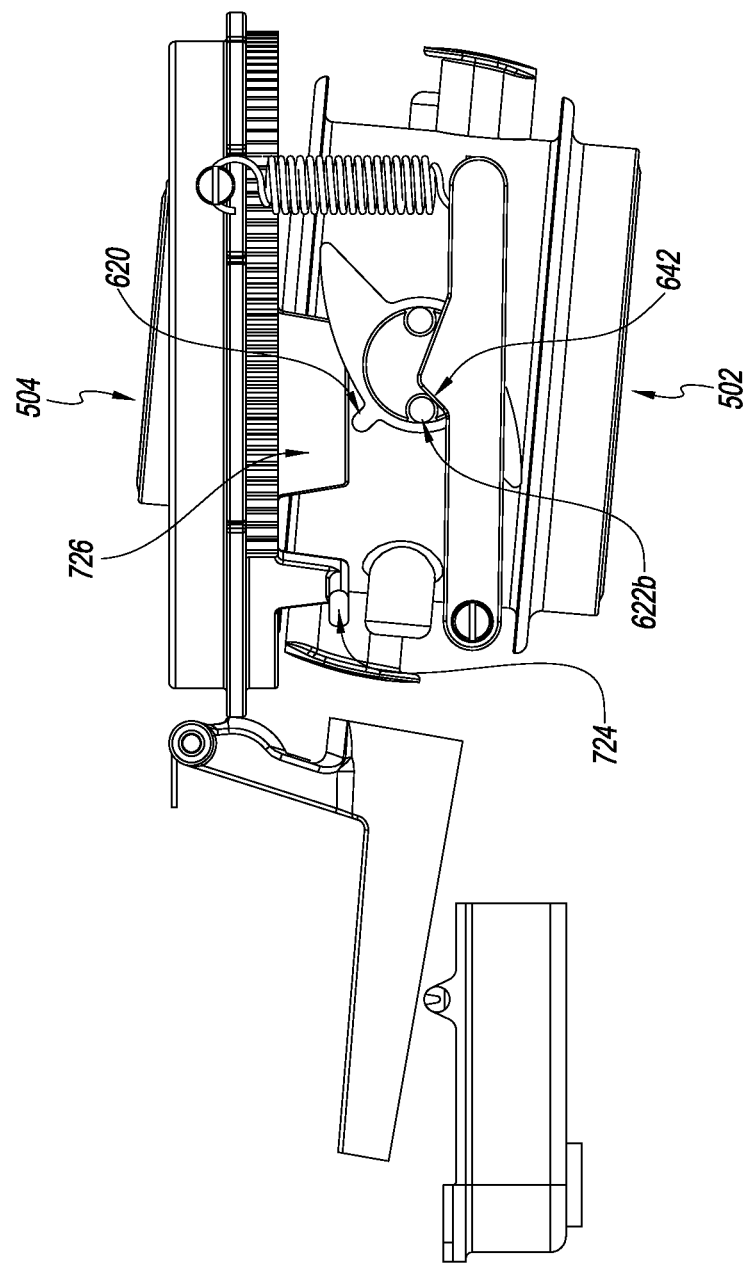

As shown in FIGS. 10 and 10A, the collar 700 has rotated (e.g., in a clockwise direction) about the axis $RA_c$ that is generally perpendicular to the axis $RA_b$ of rotation of the basket unit 500. This has engaged the projection of the collar 700 with the arm of the ratchet member 610, which has rotated about the axis $RA_b$ (e.g., in a counter-clockwise direction). As previously noted, because of the engagement of the mating features of the basket unit 500 and the ratchet member 610, rotation of the ratchet member 610 can result in rotation of the basket unit 500 as well. As such, the rotation of the ratchet member 610 has resulted in the basket unit 500 being rotated about the axis $RA_b$ as well. In some implementations, the axis of rotation $RA_b$ passes between sidewalls of the main housing 105 (e.g., in FIG. 1, between a wall near the liquid reservoir 110 and frother 115 and a wall on the opposite side of the main housing 105). In certain variants, the axis of rotation $RA_b$ passes between a front and rear of the main housing 105.

As shown due to the rotation of the ratchet member 610, the bosses 622a, 622b on the ratchet member 610 have been rotated relative to the ratchet follower 630. This rotation has resulted in one of the bosses 622b being separated from the ramps 642, 644 of the ratchet follower 630, and the other of the bosses 622a being moved along the first ramp 642 of the ratchet follower 630. As shown, the boss 622a is positioned at about an apex between the ramps 642, 644. As will be discussed below, with continued rotation of the collar 700 and ratchet assembly 600, the boss 622a will pass the apex and begin to descend along the second ramp 644.

As shown, the movement boss 622a of the ratchet member 610 along the ramp 642 of the ratchet follower 630 has resulted in the second end 634 of the ratchet follower 630 being pivoted (e.g., generally downwardly) relative to the first end 632 of the ratchet follower 630. In some embodiments, such movement of the second end 634 of the ratchet follower 630 is against the bias of the biasing member 650, which tends to energize (e.g., elongate the longitudinal length of) the biasing member 650. For example, in the position shown in FIG. 9, the biasing member 650 has an elongated length spanning from the fastener connected with frame 125 to the arm 636 of the ratchet follower 630. Such elongation of the biasing member 650 can produce a biasing force, such as a force encouraging the second end 634 of the ratchet member 610 generally upwardly.

With reference to FIGS. 11, 11A, 12, and 12A, the collar 700 has been further rotated (relative to FIGS. 10 and 10A). As shown, the projection 724 is no longer in engagement with the arm 618 of the ratchet member 610. In some embodiments, the wing 726 on the collar 700 engages one of the ribs on the ratchet member 610. In some variants, further rotation of the collar 700 about the rotational axis $RA_c$ can result in additional rotation of the ratchet member 610 about the rotational axis $RA_b$, which in turn can result in further rotation of the basket unit 500.

In some embodiments, the biasing member 650 can motivate at least one of the bosses 622a, 622b on the ratchet member 610 to traverse along (e.g., slide relative to) the second ramp 644. This is because the biasing force from the biasing member 650 is encouraging the second end 634 of the ratchet follower 630 generally upwardly. That force can be transmitted through the ratchet follower 630 to the engagement between the second ramp 644 and the boss 622a. As the second ramp 644 is at an angle relative to the direction of the transmitted biasing force, the boss 622a can be encouraged to traverse (e.g., slide down) a portion of the second ramp 644. In some embodiments, movement of the boss 622a along the second ramp 644 results in further rotation of the ratchet member 610, and thus the basket unit 500. In some embodiments, such rotation of the ratcheting member 610 via the engagement of the boss 622a and the second ramp 644 rotates the ratchet member 610 even when the projection 724 and/or wing 726 of the collar 700 are not engaged with the arm of the ratchet member 610.

Figure 14:
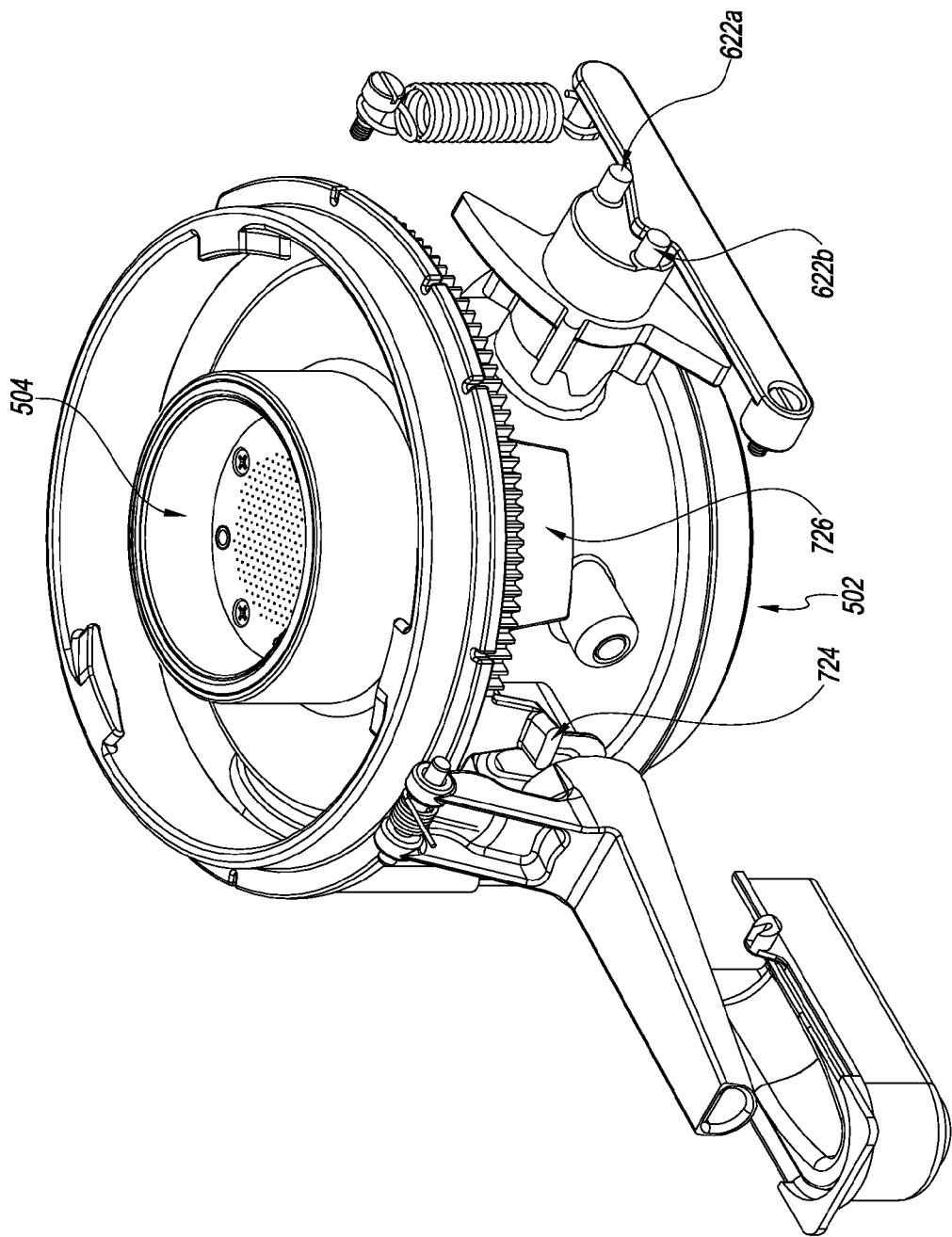
FIG. 14 illustrates a perspective view of the beverage production assembly of FIG. 4 in a position to accept a second type of cartridge for producing a second type of beverage.
Figure 14A:
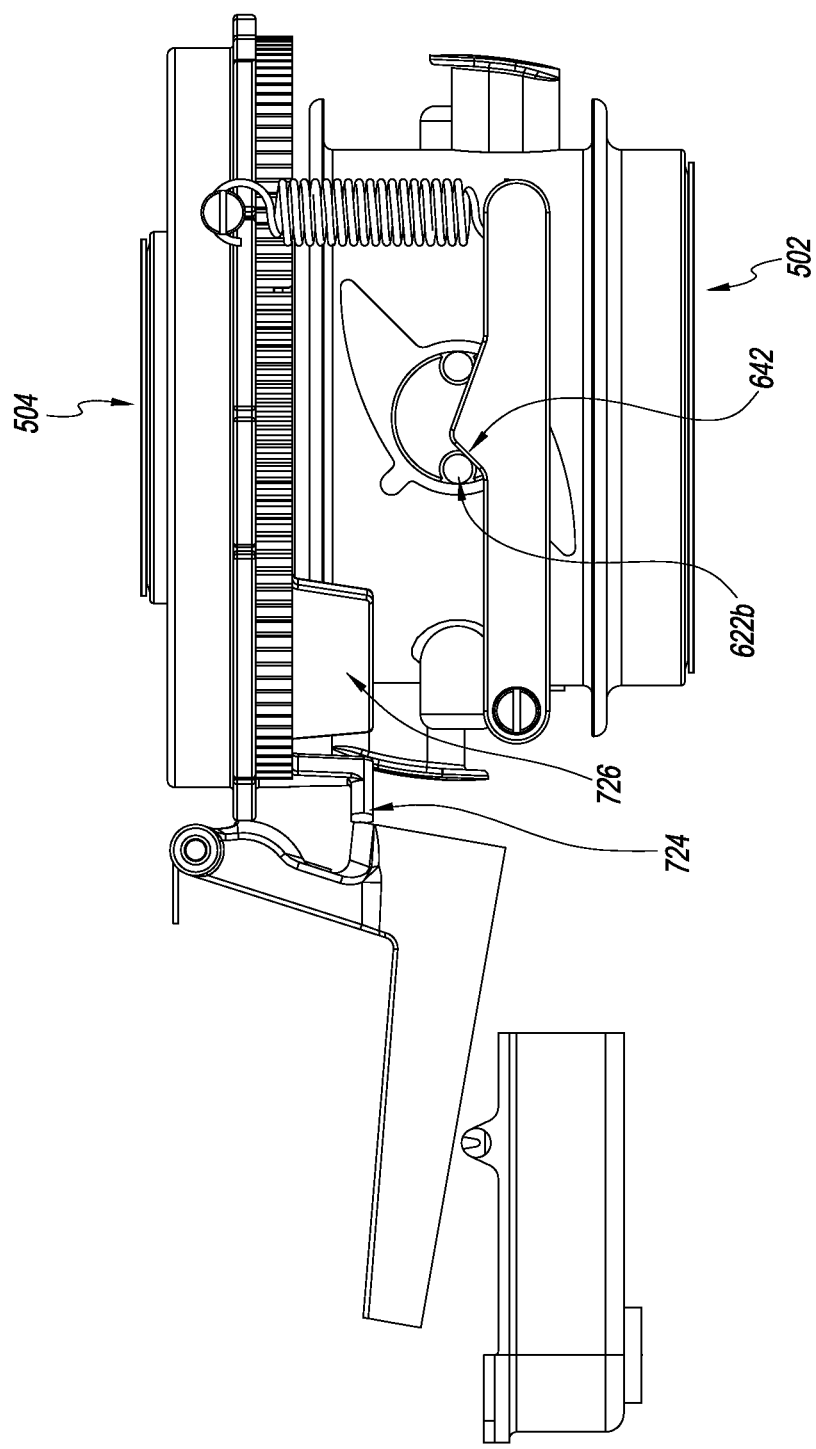
FIG. 14A illustrates a side view of the beverage production assembly of FIG. 14.

As shown in FIGS. 14 and 14A, as the basket unit 500 nears the end of the rotational movement, the boss 622b that had been separated from the ratchet follower 630 can engage the first ramp 642. This can aid in stabilizing the basket unit 500 and/or ratchet member 610, and/or can facilitate additional rotational movements, as discussed in further detail below.

FIGS. 14 and 14A illustrate the basket unit 500 at the conclusion of the rotational movement discussed above. As shown, the second chamber 504 is oriented generally upwardly and the first chamber 502 is oriented generally downwardly. Thus, between FIGS. 10 and 14A, the basket unit 500 has made approximately one half of a complete revolution (also called a half flip).

VIII. Additional Rotation (e.g., from Second Chamber to First Chamber)

In certain embodiments, the basket unit 500 can be rotated an additional amount. For example, the basket unit 500 can be rotated so as to return to approximately its initial position, such as is shown in FIG. 8. In some embodiments, the basket unit 500 is rotated the additional amount by the same or similar features and actions as those described above regarding FIGS. 8-14A, such as by engagement of the ratchet assembly 600 and the collar 700. For example, in some implementations, the projection 724 of the collar 700 can rotate into engagement with one of the arms 618 of the ratchet member 610, which can result in rotation of the ratchet member 610 and the basket unit 500 (e.g., from the position shown in FIG. 14 toward the position shown in FIG. 8). In certain embodiments, the additional rotation causes the basket unit 500 to make approximately another half flip, thereby completing approximately a complete revolution (also called a full flip) from the position shown in FIG. 8.

Various embodiments of the beverage production assembly 400 can thus be configured to position the basket unit 500 in at least two rotational positions. For example, the basket unit 500 can be positioned in a first position in which the first chamber 502 is in a loading position (e.g., oriented generally upwardly), and a second position in which the second chamber 504 is in the loading position. In certain embodiments, when one of the chambers 502, 504 is in the loading position, the other of the chambers 502, 504 is inverted. Additional details regarding the rotation of the basket unit 500 can be found in U.S. application Ser. No. 14/205,256, titled "BEVERAGE PRODUCTION MACHINES AND METHODS WITH MULTI-CHAMBERED BASKET UNITS," which is filed on the same day as the present application and the entirety of that application is hereby incorporated by reference.

IX. Ejection System

In some embodiments, the basket unit 500 may comprise an ejection mechanism that facilitates removal of a cartridge from a chamber. As previously discussed, the chamber may be configured to hold the cartridge and/or one or more beverage precursors (also called dosing material and/or a dose of material) used for the preparation of a beverage. The basket unit 500 can be oriented in a plurality of configurations including at least a first configuration and a second configuration. The ratchet member 610 can be configured to rotate the basket unit 500 between the first and second configurations. In some embodiments, the first configuration has the basket unit 500 oriented such that the first chamber 502 is oriented in a generally upward direction and the second configuration has the basket unit 500 oriented such that the first chamber 502 is oriented in a generally downward direction. After the beverage is produced, the ratchet assembly 610 may rotate the basket unit 500 into the second configuration.

In some embodiments, the basket unit 500 is configured such that the ejection mechanism 800 ejects the cartridge from the chamber in or near the inverted position. In certain variants, the ejection mechanism may begin ejecting the cartridge during the course of rotation of one of the chambers 502, 504 toward the inverted position. For example, the cartridge can be ejected prior to the chamber achieving the inverted position. In some implementations, the cartridge begins moving (e.g., sliding) relative to the corresponding chamber when that chamber is rotating toward the inverted position. For example, when the chamber is less than or equal to about 75° from the inverted position.

In some embodiments, the ejection mechanism is configured to passively eject the cartridge from the first chamber 502 and/or second chamber 504. For example, the ejection mechanism can be configured such that the cartridge is ejected from the chamber 502 by force of gravity. In certain variants, as the basket unit 500 moves into the second, generally downward facing configuration, the weight of the cartridge (and the beverage precursor and liquid therein) can encourage the cartridge to move (e.g., to fall) generally in a downward direction. In certain implementations, the basket unit 500 is adapted to not support the cartridge in the inverted position. As such, when the basket unit 500 is in the inverted position, the cartridge can be separated from the first chamber 502 by force of gravity. In some embodiments, some of the liquid introduced into the cartridge during the beverage preparation process can remain in the cartridge (e.g., in the beverage precursor and/or cartridge). This can increase the weight of the beverage precursor and/or cartridge, which can facilitate ejecting the cartridge from the first chamber 502. Although the examples above are in connection with the first chamber 502, the second chamber 504 can also be configured for passive cartridge ejection.

In some embodiments, the ejection mechanism is configured to actively eject the cartridge from the first chamber 502 and/or second chamber 504. This can aid in ejecting certain cartridges. For example, in some instances, the cartridge may be adhered to (e.g., form a seal with) the first chamber 502, which can inhibit or prevent the removal of the cartridge by gravity alone. This adherence may be amplified by the cartridge being wet from the brewing process. Although certain examples are discussed herein in connection with the first chamber 502, the second chamber 504 can also be configured for active cartridge ejection.

With reference now to an illustrated embodiment of FIG. 16, in some variations, an ejection mechanism 800 is configured to actively eject the cartridge by applying a force to the cartridge, such as to the bottom of the cartridge. For example, in certain embodiments, force can be applied to the cartridge by one or more translating members, such as pins 802.

Figure 15:
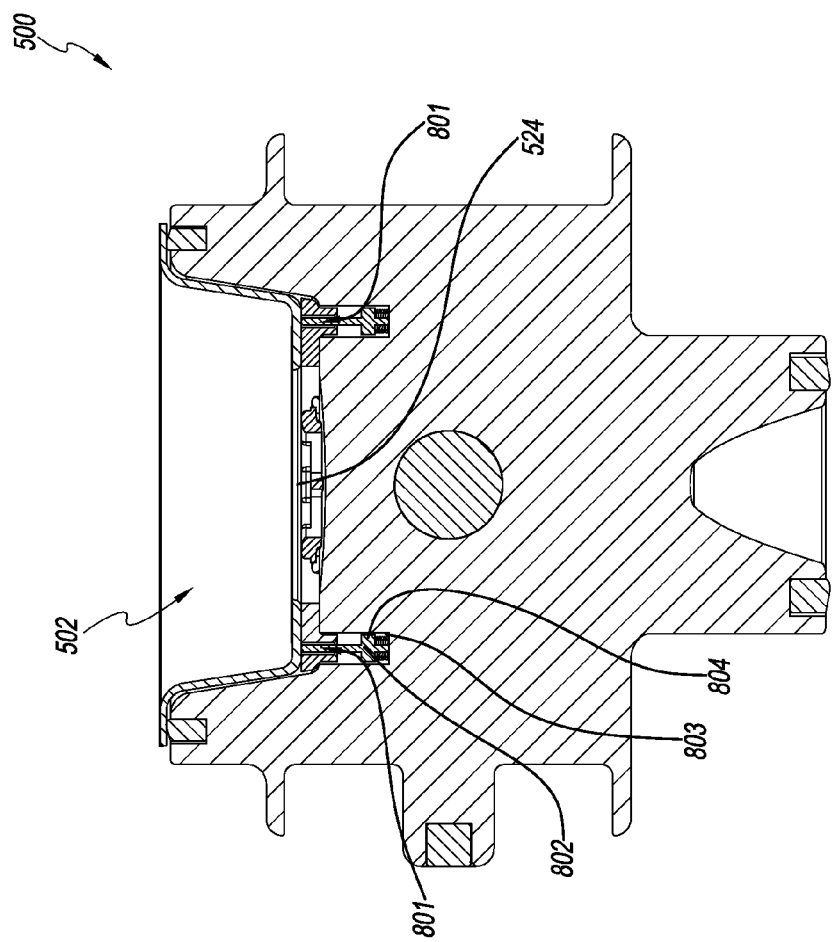
FIG. 15 illustrates a cross-sectional view of an embodiment of a brew basket unit with a cartridge ejection mechanism.

As illustrated in FIG. 15, the first chamber 502 can include a bottom portion 524 with one or more apertures 801. The pins 802 can be configured to extend through the one or more apertures 801 into the first chamber 502. Some embodiments include one, two, three, four, five, six, seven, eight, nine, ten, or more of the pins 802. In some embodiments, the pins are generally equally spaced apart from each other. For example, the embodiment illustrated includes four pins 802 that are spaced by about 90° around a circumference of the bottom portion 524.

In some embodiments, some or each of the pins 802 are biased by a respective biasing element 803. For example, each of the pins 802 can be biased in a direction toward the first chamber 502. The biasing element 803 may comprise a coil spring (e.g., as illustrated in FIG. 43), a leaf spring, or otherwise. In some embodiments, the biasing element 803 comprises metal (e.g., stainless steel), which may be more resistant to damage from typical usage than plastic and which may be better suited to shock loading and vibration than plastic. However, other materials (e.g., plastic) are also possible. Other shapes and types of biasing elements 803 are also possible.

Figure 15A:
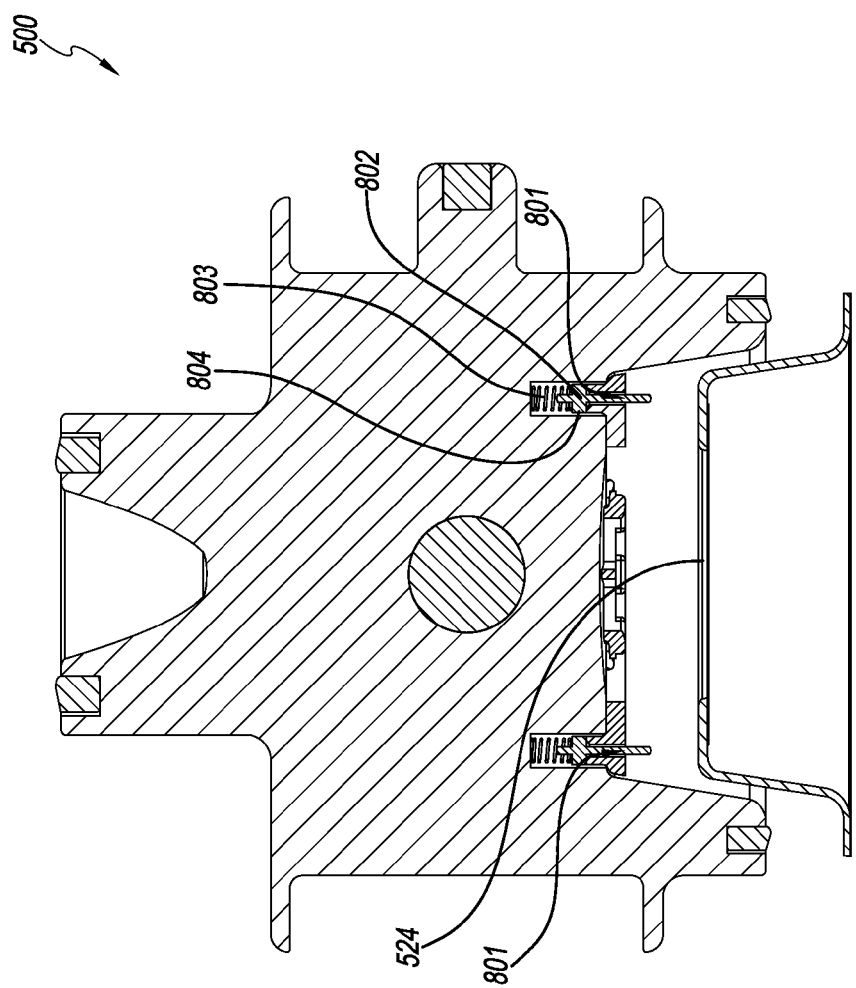
FIG. 15A illustrates the brew basket unit of FIG. 15 in an inverted position and the cartridge ejection mechanism ejecting a cartridge.

When the basket unit 500 is in an upright configuration (e.g., the loading position of FIG. 4), the bottom of the cartridge engages the pins. This can result in the weight of the beverage precursor and/or cartridge acting against the force of the biasing elements 803, thereby partly or completely overcoming the biasing force of the biasing elements 803 and depressing the one or more pins 802 downwardly (e.g., partly or completely out of the first chamber 502). When the basket unit 500 is rotated into a downward configuration (e.g., the inverted position such as is shown in FIG. 15A), the weight of the beverage precursor and/or cartridge may no longer be acting against the bias of the biasing member. This can allow the biasing element 803 to encourage the pins into the first chamber 502. The pins 802 can engage against the cartridge (e.g., in a generally downward direction), thereby encouraging ejection of the cartridge.

In some embodiments, the one or more pins 802 may comprise a flange or lip 804. The lip 804 can extend wider than the aperture 801 to inhibit or prevent the pin 802 from fully entering the first chamber 502 and/or from being pushed by the biasing element 803 into the first chamber 502. In some embodiments, a portion of the biasing element 803 can engage with the lip 804.

In some embodiments, the ejection mechanism 800 may be configured (e.g., shaped) to orient the pins 802 within the apertures 801. For example, each of the pins 802 can have a flat side (e.g., on the lip 804) that inhibits rotation of the ejection mechanism 800 within the aperture 801.

In some implementations, one or more of the pins 802 is configured to inhibit pivoting of the pin 802 relative to the aperture 800, which could result in kinking of the pin 802 in the aperture 800. For example, the lip 804 can be configured to slidingly engage a wall of a recess in the basket unit 500 and to have sufficient longitudinal length to inhibit kinking of the pin 802 in the aperture. In some implementations, the longitudinal length of the lip 804 compared to the longitudinal length of the pin 802 is at least about: 1:2, 1:3, 1:4, 1:5, 1:6, 1:8, values between the aforementioned values, or otherwise.

In some embodiments, two or more of the internal elements of the basket unit 500 may be integrated. For example, the ejection mechanism 800 and the biasing element 803 may comprise a single piece of plastic or metal, or two pieces of plastic or metal that are coupled (e.g., welded, adhered, or otherwise). Other combinations are also possible.

In some embodiments, the ejection mechanism is configured to pry the cartridge from one or more of the chambers 502, 504, as is shown in FIG. 16. For example, the ejection mechanism can include a finger or lever 820 connected with the frame 125. In some implementations, the chambers 502, 504 rotate relative to the lever. The lever can be configured to contact or otherwise engage a flange 901 on the cartridge 900 during such relative rotation. The lever can exert a force on the flange 901 so as to encourage dislodging of the cartridge from the chamber 502, 504. In some variants, the lever encourages the cartridge 900 in a direction generally away from the first chamber 502 so as to disengage the cartridge 900 from the chamber 502. The lever 820 may comprise a single piece of plastic or metal, or two pieces of plastic or metal that are coupled (e.g., welded, adhered, or otherwise). In some embodiments, the lever 820 is adjacent to a side wall of the first chamber 502 such that it is configured to rest underneath the flange 901 of the cartridge 900. When activated, the lever 820 may exert a force on the flange 901 propelling the cartridge 900 away from the first chamber 502. The lever 820 can be actuated in any fashion understood by one of skill in the art (e.g., spring loaded, mechanical force, manual force, etc.).

In some embodiments, the ejection mechanism 800 uses fluid (e.g., water) to facilitate ejection. For example, the ejection mechanism 800 can be configured to introduce fluid (e.g., water) into one of the chambers 502, 504. The fluid may act to loosen any connection (e.g., seal) between the cartridge and the bottom portion 524 of the first chamber 502. The fluid may enter the chamber before, during, or after rotation to the second configuration. For example, the ejection mechanism 800 can include a valve configured to selectively open and close a resilient conduit through which liquid (e.g., prepared beverage) can travel. In some embodiments, the valve can pinch or otherwise depress a portion of the conduit, thereby closing the conduit. When the valve is closed, liquid (e.g., water) can be introduced into the upwardly facing chamber and proceed to the portion of the conduit that is closed by the valve. The liquid can then be directed through another conduit to the downwardly facing chamber. Thus, liquid can be provided against the bottom of the cartridge. The pressure of the liquid on the cartridge and/or the weight of the liquid on the bottom of the inverted cartridge can facilitate ejection of the cartridge from the chamber. In certain embodiments, after ejection of the cartridge from a chamber, liquid (e.g., water) is introduced into that chamber to rinse away debris and/or residual beverage.

In some variants, liquid can be conveyed into or against a pivoting element (e.g., a teeter-totter element) associated with the dispensing element. In some embodiments, the teeter-totter element can rotate upward and downward in conjunction with vertical movement of the basket unit 500.

In some embodiments, the ejection mechanism 800 comprises features configured to space the cartridge from the bottom of the chambers 502, 504. This can reduce the likelihood of a vacuum being established between the cartridge and the bottom of the chambers. In some variants, the bottom portion 524 of the first chamber 502 may comprise one or more projections extending into the chamber and configured to reduce the amount of surface contact between the cartridge and the bottom portion 524 of the first chamber 502. For example, the projections can inhibit or prevent the cartridge from sitting flush against the bottom portion 524. In some variants, the cartridge may comprise projections (e.g., extending from the bottom of the cartridge). Such cartridge projections can be configured to reduce the surface contact between the cartridge and the bottom portion 524 of the first chamber 502. In some embodiments, the chamber and/or the cartridge may comprise other geometric features to reduce the likelihood of a vacuum being established between the cartridge and the bottom of the chamber. These geometric features may include, but are not limited to recesses and/or texturizing on the cartridge and/or the chamber.

Other ejection mechanisms 800 may include but are not limited to a movable bottom portion 524 to push the cartridge out of the first chamber 502; a scoop to remove the contents of the first chamber 502; one or more pins 802 located at the side or corner of the first chamber 502; etc. Ejection mechanisms may be used in combination with one another (e.g., the use of pins and gravity; pins, gravity, and fluid; etc.) or alone.

In some embodiments, the basket unit 500 may comprise a single chamber. The ejection mechanisms 800 disclosed herein may be applied to a basket unit 500 comprising a single chamber. In some embodiments, at least one of the ejection mechanisms 800 disclosed herein will be associated with the second chamber 504. In some embodiments, at least one of the ejection mechanisms disclosed herein will be associated with both the first chamber 502 and the second chamber 504. In some variants, the first chamber 502 and second chamber 504 will employ the same ejection mechanism 800. In some variants, the first chamber 502 and the second chamber 504 will employ different ejection mechanisms 800.

X. Summary

Various embodiments and examples of beverage preparation machines and methods have been described herein. Although certain embodiments and examples have been described herein with respect to cartridges for producing coffee beverages, the machine described herein can be configured to receive cartridges containing other particulate materials or components for producing many other types of beverages, such as a chocolate based product (e.g., hot cocoa), tea, juice, soup, broth, and other beverages. Further, although some embodiments have been disclosed in which liquid is introduced into the cartridge, the introduction of other phases is contemplated. For example, in some embodiments, steam or a combination of steam and liquid water is introduced into the cartridge. Additionally, although certain embodiments have been disclosed that include a single beverage component or precursor, the term "beverage component or precursor" is not limited to only a single component. Rather, the beverage component or precursor can comprise one component (e.g., coffee) or a plurality of components (e.g., coffee and a sweetener).

As used herein, the term "beverage," in addition to having its ordinary meaning, can include, among other things, any liquid or substantially liquid substance or product having a flowing quality such as juices, coffee beverages, teas, frozen yogurt, beer, wine, cocktails, liqueurs, spirits, cider, soft drinks, flavored water, energy drinks, soups, broths, combinations of the same, or the like. The term "cartridge" as used herein shall be given its ordinary and customary meaning, and includes, among other things, cartridges, capsules, cups, pods, pucks, pads, and the like, whether or not such cartridge is capable of being pierced or otherwise ruptured in order to form an inlet and/or outlet for the cartridge.

Furthermore, the disclosed apparatus, systems, and methods may be used or employed in a commercial setting, such as at a coffeehouse or coffee shop, or in a residential setting, such as at a user's home. While the term "user" may be referred to as a barista in some embodiments and applications, the user may include other individuals such as a manager, employee, customer, client, colleague, family member, friend, acquaintance, or any other individual. In some embodiments, the user may include a machine instead of, or in addition to, a person.

Although this disclosure describes certain embodiments and examples of beverage preparation machines, it will be understood by those skilled in the art that many aspects of the methods and devices shown and described in the present disclosure may be differently combined and/or modified to form still further embodiments or acceptable examples. All such modifications and variations are intended to be included herein within the scope of this disclosure. Indeed, a wide variety of designs and approaches are possible and are within the scope of this disclosure. No feature, structure, or step disclosed herein is essential or indispensable. Moreover, while illustrative embodiments have been described herein, the scope of any and all embodiments having equivalent elements, modifications, omissions, combinations (e.g., of aspects across various embodiments), adaptations and/or alterations as would be appreciated by those in the art based on the present disclosure. Although there may be some embodiments within the scope of this disclosure that are not expressly recited above or elsewhere herein, the present disclosure contemplates and includes all embodiments within the scope of what this disclosure shows and describes. Further, this disclosure contemplates and includes embodiments comprising any combination of any structure, material, step, or other feature disclosed anywhere herein with any other structure, material, step, or other feature disclosed anywhere herein.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language such as, among others, "can," "could," "might," or "may," unless specifically stated otherwise, are otherwise understood within the context as used in general to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15°, 10°, 5°, 3°, 1°, 0.1°, or otherwise. Similarly, in certain embodiments, the terms "generally perpendicular" and "substantially perpendicular" refer to a value, amount, or characteristic that departs from exactly perpendicular by less than or equal to 15°, 10°, 5°, 3°, 1°, 0.1°, or otherwise.

The language of the claims is to be interpreted broadly based on the language employed in the claims and not limited to the examples described in the present specification or during the prosecution of the application, which examples are to be construed as non-exclusive.

Some embodiments have been described in connection with the accompanying drawings. However, the figures are not drawn to scale. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

In summary, various illustrative embodiments and examples of beverage preparation machines have been disclosed. Although the beverage preparation machines have been disclosed in the context of those embodiments and examples, it will be understood by those skilled in the art that this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Accordingly, the scope of this disclosure should not be limited by the particular disclosed embodiments described above, but should be determined only by a fair reading of the claims that follow as well as their full scope of equivalents.

The following is claimed:

1. A system for ejecting a cartridge from a basket unit, the system comprising:
   a chamber for receiving the cartridge, the chamber rotatable from a first position to a second position;
      wherein in the first position the chamber has a upwardly orientated opening, wherein in the second position the opening is downwardly orientated and is located above the first position and the chamber is configured to receive a cartridge;
      wherein the chamber comprises an interior and a bottom configured to be in communication with the cartridge when loaded; and
      wherein the bottom comprises an aperture;
   an ejector configured to eject the cartridge from the chamber when the opening is downwardly orientated, the ejector comprising:
      a pin configured to extend through the aperture and contact the cartridge to eject the cartridge from the chamber;

a biasing member to bias the pin towards the interior of the chamber;
three additional apertures;
three additional pins configured to extend through the three additional apertures; and
three additional biasing members.

2. The system of claim 1, wherein the ejector comprises the use of gravity to aid in removing the cartridge from the chamber.

3. The system of claim 1, wherein the apertures are spaced 90 degrees apart from each other.

4. The system of claim 1, wherein the ejector comprises an inlet configured to allow water to enter the chamber.

5. The system of claim 1, wherein the ejector comprises a lever configured to engage a cartridge such that the cartridge is driven away from the bottom.

6. A system for ejecting a single-serve beverage cartridge comprising a beverage precursor material, the system comprising:
a frame; and
a basket unit rotatable in the frame, the basket unit comprising:
a first side with a cartridge-receiving chamber, the chamber including an interior with a bottom with an aperture;
wherein, when the basket unit is in a first position, the first side is upwardly oriented;
wherein, when the basket unit is in a second position, the first side is downwardly oriented;
an ejection mechanism comprising:
a pin positioned within the aperture,
a biasing member to bias the pin towards the interior of the chamber;
wherein as a cartridge is positioned within the chamber, the pin is depressed when the basket unit is in the first position and when the basket unit is rotated to the second position the pin pushes the cartridge out of the chamber; and
three additional apertures, three additional pins configured to extend through the three additional apertures, and three additional biasing members.

7. The system of claim 6, wherein the apertures are spaced 90 degrees apart from each other.

8. An apparatus for ejecting a cartridge from a multi-chamber basket, the apparatus comprising:
a basket that moves from at least a first configuration to a second configuration,
the basket comprising a plurality of chambers including at least a first chamber, configured to receive a cartridge, and a second chamber opposite the first chamber;
wherein in the first configuration, the first chamber is located in a first position vertically above a second position;
wherein in the second configuration, the first chamber is located in the second position;
wherein the first chamber comprises an interior and a bottom configured to be in communication with a cartridge when loaded; and
wherein the bottom comprises an aperture;
an ejection mechanism to eject the cartridge from the chamber, the ejection mechanism comprising:
a pin configured to extend through the aperture and contact the cartridge to eject the cartridge from the chamber;
a biasing member to bias the pin towards the interior of the chamber;
three additional apertures;
three additional pins configured to extend through the three additional apertures; and
three additional biasing members.

9. The apparatus of claim 8, wherein the ejection mechanism comprises the use of gravity to eject the cartridge from the chamber.

10. The apparatus of claim 8, wherein the apertures are spaced 90 degrees apart from each other.

11. The apparatus of claim 8, wherein the ejection mechanism comprises an inlet configured to allow water to enter the chamber.

12. The apparatus of claim 8, wherein the ejection mechanism comprises a lever configured to engage a cartridge such that the cartridge is driven away from the bottom.

* * * * *